US010481627B2

(12) United States Patent
Butikofer et al.

(10) Patent No.: US 10,481,627 B2
(45) Date of Patent: Nov. 19, 2019

(54) CONNECTION CHECK IN FIELD MAINTENANCE TOOL

(71) Applicant: FISHER-ROSEMOUNT SYSTEMS, INC., Round Rock, TX (US)

(72) Inventors: Christian R. Butikofer, Eden Prairie, MN (US); Anthony Ferguson, Minnestrista, MN (US); Christopher P. Kantzes, Minneapolis, MN (US); Jon Westbrock, Rosemount, MN (US); Thinh D. Le, Minneapolis, MN (US); Alden C. Russell, III, Minnetonka, MN (US); Alan R. Dewey, Plymouth, MN (US); Mehul Rajeshbhai Dalal, Pune (IN); Todd M. Toepke, Eden Prairie, MN (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 313 days.

(21) Appl. No.: 15/381,868

(22) Filed: Dec. 16, 2016

(65) Prior Publication Data

US 2018/0024582 A1      Jan. 25, 2018

(30) Foreign Application Priority Data

Jul. 25, 2016   (IN)   .............................. 201621025381

(51) Int. Cl.
*G05F 1/625*     (2006.01)
*G05B 15/02*     (2006.01)
(Continued)

(52) U.S. Cl.
CPC ............. *G05F 1/625* (2013.01); *G05B 15/02* (2013.01); *G05F 1/66* (2013.01); *G06F 1/189* (2013.01);
(Continued)

(58) Field of Classification Search
CPC ........ G05B 2219/25428; G05B 19/042; G05B 2219/31121; G05B 2219/24001
(Continued)

(56) References Cited

U.S. PATENT DOCUMENTS

| 5,999,740 A | 12/1999 | Rowley |
| 6,035,423 A | 3/2000 | Hodges et al. |

(Continued)

FOREIGN PATENT DOCUMENTS

| CN | 101410800 A | 4/2009 |
| EP | 1 816 530 A1 | 8/2007 |

(Continued)

OTHER PUBLICATIONS

Search Report for Application No. GB1709952.4, dated Nov. 29, 2017.

(Continued)

*Primary Examiner* — Jonathan Han
(74) *Attorney, Agent, or Firm* — Marshall, Gerstein & Borun LLP

(57) ABSTRACT

Multi-functional field maintenance (FM) tools that connect to process control devices, such as FOUNDATION Fieldbus and Highway Addressable Remote Transducer devices, can automatically detect and simultaneously identify communications, troubleshoot connections, and supply power in a process control plant. Simplifying the troubleshooting process, by guiding a user of a multi-functional FM tool through recommended troubleshooting steps, while simultaneously detecting and correcting issues reduces the number of tools required to maintain process control devices, reduces the risk of damage, and improves efficiency by minimizing production downtime.

57 Claims, 16 Drawing Sheets

(51) Int. Cl.
*G05F 1/66* (2006.01)
*G06F 1/18* (2006.01)
*G06F 1/28* (2006.01)
*G06F 1/30* (2006.01)
*G06F 3/0484* (2013.01)

(52) U.S. Cl.
CPC .................. *G06F 1/28* (2013.01); *G06F 1/30* (2013.01); *G06F 3/0484* (2013.01)

(58) Field of Classification Search
USPC ....... 700/17, 129, 19; 702/183, 118, 184, 57
See application file for complete search history.

(56) References Cited

U.S. PATENT DOCUMENTS

| | | | |
|---|---|---|---|
| 6,282,709 | B1 | 8/2001 | Reha et al. |
| 6,889,166 | B2 | 5/2005 | Zielinski et al. |
| 7,010,294 | B1 | 3/2006 | Pyotsia et al. |
| 7,016,741 | B2 | 3/2006 | Arntson |
| 7,177,122 | B2 | 2/2007 | Hou et al. |
| 7,227,656 | B1 | 6/2007 | Kato |
| 7,289,994 | B2 | 10/2007 | Nixon et al. |
| 7,328,078 | B2 | 2/2008 | Sanford et al. |
| 7,421,531 | B2 | 9/2008 | Rotvold et al. |
| 7,451,606 | B2* | 11/2008 | Harrod ............... F24F 11/0086 62/125 |
| 7,539,978 | B1 | 5/2009 | Haddox et al. |
| 7,620,948 | B1 | 11/2009 | Rowe et al. |
| 7,675,932 | B2 | 3/2010 | Schumacher |
| 7,680,549 | B2* | 3/2010 | Kavaklioglu ......... C10G 11/187 700/21 |
| 7,840,296 | B2 | 11/2010 | Sanford et al. |
| 7,975,266 | B2 | 7/2011 | Schneider et al. |
| 8,055,371 | B2 | 11/2011 | Sanford et al. |
| 8,127,241 | B2 | 2/2012 | Blevins et al. |
| 8,204,717 | B2 | 6/2012 | McLaughlin et al. |
| 8,286,154 | B2 | 10/2012 | Kaakani et al. |
| 8,390,150 | B2* | 3/2013 | Vande Vusse ...... G05B 19/0423 307/112 |
| 8,458,659 | B2 | 6/2013 | Resnick et al. |
| 8,626,916 | B2 | 1/2014 | Armstrong et al. |
| 8,762,745 | B2* | 6/2014 | Seiler ............... G05B 19/4185 713/300 |
| 8,766,794 | B2 | 7/2014 | Ferguson et al. |
| 9,003,387 | B2 | 4/2015 | Van Camp et al. |
| 9,244,455 | B2 | 1/2016 | Peterson et al. |
| 2004/0039458 | A1 | 2/2004 | Mathiowetz et al. |
| 2004/0181787 | A1 | 9/2004 | Wickham et al. |
| 2004/0230401 | A1 | 11/2004 | Duren et al. |
| 2005/0132349 | A1 | 6/2005 | Roberts et al. |
| 2005/0228798 | A1 | 10/2005 | Shepard et al. |
| 2005/0276233 | A1* | 12/2005 | Shepard ................ H04L 45/42 455/426.2 |
| 2007/0004168 | A1 | 1/2007 | Zips |
| 2007/0022403 | A1 | 1/2007 | Brandt et al. |
| 2007/0118699 | A1 | 5/2007 | Synard et al. |
| 2007/0142936 | A1* | 6/2007 | Denison ............. G05B 13/0275 700/29 |
| 2007/0169079 | A1 | 7/2007 | Keller et al. |
| 2008/0040449 | A1 | 2/2008 | Grant et al. |
| 2008/0049984 | A1 | 2/2008 | Poo et al. |
| 2008/0081579 | A1* | 4/2008 | Chen .................... H04W 4/00 455/187.1 |
| 2008/0126005 | A1 | 5/2008 | Guenter et al. |
| 2008/0268784 | A1 | 10/2008 | Kantzes et al. |
| 2009/0094462 | A1 | 4/2009 | Madduri |
| 2009/0133012 | A1 | 5/2009 | Shih |
| 2009/0138870 | A1 | 5/2009 | Shahindoust et al. |
| 2009/0320125 | A1 | 12/2009 | Pleasant, Jr. et al. |
| 2010/0146497 | A1 | 6/2010 | Kogan et al. |
| 2011/0087461 | A1 | 4/2011 | Hollander et al. |
| 2011/0224808 | A1 | 9/2011 | Lucas et al. |
| 2012/0038458 | A1* | 2/2012 | Toepke ................ G05B 19/042 340/6.1 |
| 2012/0038760 | A1 | 2/2012 | Kantzes et al. |
| 2013/0024495 | A1 | 1/2013 | Armstrong et al. |
| 2013/0070745 | A1 | 3/2013 | Nixon et al. |
| 2013/0214898 | A1 | 8/2013 | Pineau et al. |
| 2014/0018955 | A1 | 1/2014 | Asakawa et al. |
| 2014/0019768 | A1 | 1/2014 | Pineau et al. |
| 2014/0047107 | A1 | 2/2014 | Maturana et al. |
| 2014/0056173 | A1 | 2/2014 | Nakamura et al. |
| 2014/0181955 | A1 | 6/2014 | Rosati |
| 2014/0198420 | A1* | 7/2014 | Kojovic ................ H02H 7/262 361/86 |
| 2014/0273847 | A1 | 9/2014 | Nixon et al. |
| 2015/0024710 | A1 | 1/2015 | Becker et al. |
| 2015/0098158 | A1 | 4/2015 | Kemp et al. |
| 2015/0281227 | A1 | 10/2015 | Foxey et al. |
| 2016/0026813 | A1 | 1/2016 | Neitzel et al. |
| 2016/0132046 | A1 | 5/2016 | Beoughter et al. |
| 2016/0154394 | A1 | 6/2016 | Peterson et al. |
| 2016/0299175 | A1 | 10/2016 | Dewey et al. |
| 2017/0078265 | A1 | 3/2017 | Sundaresh et al. |
| 2017/0257378 | A1 | 9/2017 | Sprenger et al. |

FOREIGN PATENT DOCUMENTS

| | | |
|---|---|---|
| EP | 1 906 623 A1 | 4/2008 |
| EP | 2 026 223 A2 | 2/2009 |
| EP | 2 067 088 A2 | 6/2009 |
| EP | 2 782 073 A1 | 9/2014 |
| GB | 2 465 495 A | 5/2010 |
| GB | 2 535 839 A | 8/2016 |
| GB | 2 539 311 A | 12/2016 |
| GB | 2 548 007 A | 9/2017 |
| JP | 2002-007129 A | 1/2002 |
| JP | 2004-234056 A | 8/2004 |
| JP | 2009-187420 A | 8/2009 |
| WO | WO-2008/045258 A2 | 4/2008 |
| WO | WO-2013/184117 A1 | 12/2013 |
| WO | WO-2016/020165 A1 | 2/2016 |
| WO | WO-2017/085923 A1 | 5/2017 |

OTHER PUBLICATIONS

Search Report for Application No. GB1710027.2, dated Oct. 19, 2017.
Search Report for Application No. GB1710029.8, dated Dec. 21, 2017.
Search Report for Application No. GB1710117.1, dated Oct. 23, 2017.
Search Report for Application No. GB1710119.7, dated Oct. 24, 2017.
Search Report for Application No. GB1710124.7, dated Oct. 20, 2017.
Search Report for Application No. GB1710125.4, dated Oct. 12, 2017.
Search Report for Application No. GB1710210.4, dated Oct. 26, 2017.
Search Report for Application No. GB1710211.2, dated Nov. 30, 2017.
Search Report for Application No. GB1710266.6, dated Dec. 19, 2017.
Search Report for Application No. GB1711106.3, dated Nov. 21, 2017.
Beamex MC5 (discontinued) description, Retrieved from the Internet at http://www.beamex.com/beamex_products/MC5-%28discount%29/na15ghgl/355ca6b7-66ff-469f-9bd4-1f26c0870452#Features (Jul. 8, 2016).
Beamex MC6 Advanced Field Calibrator and Communicator, Product Brochure (2016).
Costall, "Essential Concepts of Intrinsic Safety," Spark Institute. Retrieved from the internet at http://www.sparkinstitute.ca/wp/WP00_-_Essential_Concepts_of_Intrinsic_Safety.pdf (May 24, 2016).
Emerson Process Management, "475 Field Communicator." Retrieved from the internet at http://www2.emersonprocess.com/siteadmincenter/PM%20Asset%20Optimization%20Documents/ProductReferenceAndGuides/475_ru_usermanual.pdf (May 26, 2016).

(56) References Cited

OTHER PUBLICATIONS

Examination Report Under Section 18(3) in Application No. GB1015879.8, dated Mar. 13, 2014.
Examination Report Under Section 18(3) in Application No. GB1015879.8, dated Mar. 20, 2015.
Examination Report under Section 18(3) dated Oct. 2, 2014 in Application No. GB1015879.8, 3 pgs.
Fieldbus Engineer's Guide, Pepperl+Fuchs (May 2013), 474 pages.
Fieldbus Foundation, "Foundation Fieldbus Application Guide; 31,25 kbit/s Intrinsically Safe Systems." Retrieved from the internet at http://www.fieldbus.org/images/stories/enduserresources/technicalreferences/documents/instrinsicallysafesystems.pdf (May 26, 2016).
First Office Action for corresponding Chinese Patent Application No. 201010572412.4, dated Jun. 5, 2014, 8 pgs.
Fluke 709 Precision Loop Calibrator, User Manual, © 2013 Fluke Corporation.
Fluke 709/709H Precision Loop Calibrator, Quick Reference Guide (2013).
GE Measurement & Control Systems, Druck DPI 620-IS advanced modular calibrator user manual, © Druck Limited 2010.
Office Action for corresponding Japanese Patent Application No. 2010-215391, dated Aug. 19, 2014, 4 pgs.
Omega, "Digital Signal Transmission." Retrieved from the internet at https://www.omega.com/literature/transactions/volume2/digitalsignal4.html (May 26, 2016).
Omega, "Understanding What's Meant by Intrinsically Safe." Retrieved from the internet at http://www.omega.com/technical-learning/understanding-what-is-meant-by-intrinsically-safe.html (May 26, 2016).
Search Report for Application No. GB1015879.8, dated Jan. 13, 2011.
U.S. Appl. No. 14/682,714, filed Apr. 9, 2015.
U.S. Appl. No. 15/214,949, filed Jul. 20, 2016.
U.S. Appl. No. 15/214,975, filed Jul. 20, 2016.
U.S. Appl. No. 15/216,810, filed Jul. 22, 2016.
User Manual for Beamex® MC6 Advanced Field Calibrator and Communicator (2012-2015).
Wikipedia, "Intrinsic Safety." Retrieved from the internet at https://en.wikipedia.org/wiki/intrinsic_safety (May 24, 2016).
Wiring and Installation 31.25 kbit/s, Voltage Mode, Wire Medium, Application Guide, Foundation™ Fieldbus, © 1996 Fieldbus Foundation.

\* cited by examiner

CONNECTION CHECK IN FIELD MAINTENANCE TOOL

TECHNICAL FIELD

The present disclosure generally relates to a field maintenance tool for a process control system, and more particularly a field maintenance tool optimized to function in the presence of hazardous conditions in a process control system.

BACKGROUND

Process control systems, like those used in chemical and petroleum processes, typically include one or more process controllers communicatively coupled to at least one host or operator workstation and to one or more field devices via analog, digital, or combined analog/digital buses.

A field device generally is or includes an actuator, sensor, or some combination thereof. Field devices perform functions within the process plant, such as opening or closing valves and measuring process parameters. Example field devices include valves, valve positioners, switches, pumps, and transmitters (e.g., for transmitting measurements obtained via temperature, pressure, or flow rate sensors). Field devices may be communicatively linked to process controllers and/or other field devices via wireless or wired links, and may communicate according to various protocols.

The process controllers (sometimes referred to as "controllers") receive signals indicative of process measurements made by the field devices and/or other information pertaining to the field devices, use this information to implement control routines, and subsequently generate control signals that are sent over buses or other communication channels to control the operation of the field devices. When the controller executes one or more of the control routines, the controller transmits to a field device a control signal (i.e., control output) based on: (i) one or more received control inputs (e.g., one or more received signals indicative of process measurements made by field devices and/or other information pertaining to the field devices), and (ii) the logic of the one or more control routines.

With the information collected from the field devices and process controllers, an operator or a technician can execute one or more applications at an operator workstation that perform any desired function with respect to the process, such as, for example, configuring the process, viewing the current state of the process, and/or modifying the operation of the process.

As noted, field devices may be configured to communicate with controllers and/or other field devices according to various communication protocols. In traditional 4-20 mA systems, a field device communicates with a controller by way of a current loop (e.g., one or more conductive wires) carrying a 4-20 mA signal indicative of a measurement or control command. For example, a level transmitter may sense a tank level, transmit a current signal corresponding to that measurement (e.g., a 4 mA signal for 0%, a 12 mA signal for 50%, and 20 mA for 100%). The controller receives the current signal, determines the tank level measurement based on the current signal, and takes some action based on the tank level measurement (e.g., opening or closing an inlet valve). Traditional 4-20 mA systems are popular in the industry due to the simplicity and effectiveness of the design. Unfortunately, traditional 4-20 mA current loops can only transmit one particular process signal. Thus, a set-up including a control valve and a flow transmitter on a pipe carrying material may require three separate current loops: one for carrying a 4-20 mA signal indicative of control command for the valve (e.g., move the valve to 60% open); a second for carrying a 4-20 mA signal indicative of the valve's actual position (e.g., so that the controller knows the degree to which the valve has responded to control commands); and a third for carrying a 4-20 mA signal indicative of a measured flow. As a result, a traditional 4-20 mA set-up in a plant that has a large number of field devices may require extensive wiring, which can be costly and can lead to complexity when setting up and maintaining the communication system.

More recently, there has been a move within the process control industry to implement digital communications within the process control environment. For example, the Highway Addressable Remote Transmitter (HART®) protocol uses the loop current magnitude to send and receive analog signals, but also superimposes a digital carrier signal on the current loop signal to enable two-way field communication with smart field instruments. As another example, the FOUNDATION Fieldbus® protocol, provides all digital communications on a two-wire bus associated with an all-digital I/O communication network.

These digital communication protocols generally enable more field devices to be connected to a particular bus, support more and faster communication between the field devices and the controller and/or allow field devices to send more and different types of information, such as information pertaining to the status and configuration of the field device itself, to the process controller. Furthermore, these standard digital protocols enable field devices made by different manufacturers to be used together within the same process control network.

Regardless of the communication protocol utilized, field devices may require on-site setup, configuration, testing, and maintenance. For example, before a field device can be installed at a particular location at a process control plant, the field device may need to be programmed and may then need to be tested before and after the field device is installed. Field devices that are already installed may also need to be regularly checked for maintenance reasons or, for example, when a fault is detected and the field device needs to be diagnosed for service or repair. Generally speaking, configuration and testing of field devices are performed on location using a handheld, portable maintenance tool. Because many field devices are installed in remote, hard-to-reach locations, it is more convenient for a user to test the installed devices in such remote locations using a handheld, portable tool rather than using a full configuration and testing device, which can be heavy, bulky, and non-portable, generally requiring the installed field device to be transported to the site of the diagnostic device.

In the case in which a field device is at least partially operational and supplied with power via a local bus, a handheld maintenance tool, such as a portable testing device ("PTD"), can connect to a communication terminal of the field device to run a diagnostic routine. Generally, the field device and the PTD communicate over a two-wire or a four-wire communication connection or line, typically referred to as a bus. It is known to use a handheld device to connect to, for example, a FOUNDATION Fieldbus® or a HART® communication line or other communication bus to communicate with devices connected to that communication line or bus.

In some cases, testing a field device on location may not be possible unless power is supplied to the field device. This may occur, for example, when there is a power outage, when there is a power issue localized to the field device itself, or when one or more field devices are offline, i.e., in fault situations. Generally, power may be provided to the field device by connecting the field device to a power source via a two-wire power line. For example, FOUNDATION Fieldbus® devices are powered via the same terminals used for communicating with the FOUNDATION Fieldbus® device. However, portable power considerations and Intrinsic Safety ("IS") standards restrict the manner in which power can be provided to a field device, especially when the field device is installed in a critical or dangerous process control system in the field.

In some cases, Intrinsic Safety ("IS") standards restrict the manner in which power and other communication signals can be provided to a field device, especially when the field device is installed in a critical or dangerous process control system in the field. Generally, higher voltages are used for providing power to the field devices than the voltages that are used for communicating with the field devices. Additionally, certain safety measures must be implemented before powering a field device in the field. In particular, according to IS guidelines, a technician cannot switch on the power of a field device within the field device itself and cannot use devices that generate voltages over certain predetermined levels.

The IS guidelines prohibit internal power switching and generation of larger voltages because field devices are often installed in proximity to volatile substances or volatile processes, and thus there is higher possibility of causing an explosion by arcing or generating sparks when a high voltage or a power connection is applied to the field device. For reference, an internal switch may be considered any switch that is integrally connected within or physically housed within a field device and/or that is fixed to the field device. Accordingly, the technician servicing the field device cannot use or install a switch within the field device to switch on the power to the device from a provisioned or redundant power line.

Related IS guidelines also advise against switching on power within a PTD that is connected to a field device and that is located within a vicinity of the field device. IS standards generally require manual intervention when applying power to a non-operating or a non-powered field device installed in the field. Although it may be desirable to configure existing PTDs with automatic power functions for powering a field device, this configuration is generally prohibited under the IS standards, especially when providing higher power signals to the field devices for powering the field devices or for testing purposes.

To comply with IS standards, some existing PTDs include an interface with four connection ports for coupling four lines or wires between the PTD and a field device undergoing testing. Generally, a first pair of lines is used for transmitting communication signals at a first voltage range and a second pair of lines is used for powering the field device at a second and higher voltage or voltage range. The first pair of lines is primarily used whenever the field device is undergoing testing, and the second pair of lines/wires is used only when power is needed to be provided to the field device to enable the field device to execute a function (e.g., a test function or a configuration function).

In this manner, additional power to the field device undergoing testing always requires manual intervention that includes connecting additional wires between the field device and the PTD. In short, IS standards have generally limited the development of portable field device testing equipment to require two separate sets of lines or lead sets and three or four ports for connecting a field device to the portable testing equipment.

Installing and maintaining instruments in a typical process plant requires multiple portable tools, such as a communicator for initial set-up and configuration, a calibrator for verification and adjustment of instrument output, and a digital multi-meter for troubleshooting of loop wiring, connections, power supply, and the instrument itself. For example, maintaining rotating equipment (e.g. motors, pumps, and generators) may require additional tools for collecting and analyzing vibration data used to detect impending failure.

The potential presence of explosive gasses or dusts often pose additional requirements that these portable tools be tested and certified by agencies such as Factory Mutual or Canadian Standards Association, in order to be certified as safe for use in hazardous areas, such as the IS standards discussed above. As a result, technicians often need to acquire and/or carry multiple specialized portable tools into the plant in order to perform the required work.

When a user, such as a service technician, performs maintenance testing and/or communications with a field device along a digital process control system, a handheld maintenance tool is typically electrically connected to an electrical loop or bus for data and/or power or directly to a field device. The maintenance tool initially attempts to communicate with the field device, such as by sending and/or receiving digital communication signals along the loop or bus. If the electrical loop or bus is in proper operating condition, the communications signals may be sent and/or received without problem. However, if the electrical loop or bus or the field device contains an electrical fault, such as a short or a break, communications may be impeded, and it may be necessary to diagnose the loop, bus, and/or field device to identify the fault.

In the past, when such a fault was identified, a second, separate loop diagnostics tool would be used to test the lines. This would require the technician to carry a second tool and/or require the technician to go get a second tool. Further, if the device was located in a hazardous area (i.e., in a potentially explosive atmosphere), the technician would need to make sure to have an intrinsically safe loop diagnostics tool. This is necessary because a loop diagnostics tool frequently includes a multi-meter or similar device that emits a power level electrical current to the electrical lines being tested.

Maintenance technicians in process industries perform a wide variety of tasks including installation of instruments, configuration/set-up, calibration, data collection, and troubleshooting of instruments and measurement loops. Performance of these tasks require a myriad of ever-changing portable tools, each with unique user interfaces, menus, and displays.

In the past, although there have been intrinsically safe maintenance tools that communicate with these digital process control system field devices, these maintenance tools have not had the ability to also provide intrinsically safe loop diagnostics. It would be advantageous to reduce the number of tools that the maintenance technician needs to carry and work with in the process plant while installing and/or otherwise working on field devices in the process system.

In the presence of flammable materials or explosive gasses an incorrect connection may cause damage to a process control device. By safely guiding a technician through the connection process and performing connection steps in a safe and proper way, intrinsically safe maintenance tools improve the overall reliability and safety of process control systems.

Furthermore, by providing tools that allow a variety of functions to coexist within the same device, such as communications, process measurements, supply of power, etc. maintenance tools improve the reliability and efficiency of maintenance events. By automating detection, measurement, and mitigation functions and having a variety of tools at hand in the same device, the tool eliminates possible sources of erroneous maintenance procedures, improving the overall safety of the process control system.

SUMMARY

This disclosure describes a multi-functional field maintenance (FM) tool adapted to connect to a field device, identify a communication protocol supported by the field device, and communicate with the field device by way of the identified communication protocol. Advantageously, the FM tool performs tasks previously requiring multiple tools. While a user needing to troubleshoot both FOUNDATION Fieldbus® and HART® devices previously needed to carry a portable tool for troubleshooting devices of each type, for example, that same user can now perform the same tasks using only the FM tool.

The FM tool may include a variety of terminals to connect to a communication bus Subsets of the plurality of terminals may be configured for connection communication buses configured for various communication protocols. For example, a first subset of the plurality of terminals may be configured for connection to a HART® bus or loop, and a second subset of the plurality of terminals may be configured for connect to a FOUNDATION Fieldbus® segment. Furthermore, an FM tool can identify and connect to a FOUNDATION Fieldbus® device with on a HART® bus or loop, and a HART® device on a FOUNDATION Fieldbus® segment.

The FM tool may include a routine for identifying the communication protocol of the connected communication bus and/or Field device. For example, the routine may automatically associate a first communication protocol (e.g., HART®) with a first subset of the plurality of terminals, and may automatically associate a second communication protocol (e.g, FOUNDATION Fieldbus®) with a second subset of the plurality of terminals.

The FM may include a routine for communicating with the field device by way of the identified communication protocol. For example, the routine may format messages according to the selected protocol.

In some embodiments, the FM tool may display information pertaining to the field device and/or communication bus, for example a power or communications status. Furthermore, the FM tool may take measurements at its power terminals, decide whether or not it is acceptable to allow the user to enable power, enable power, and make a subsequent measurement to determine if power was enabled as expected. Issues that may occur include detecting short circuits, the lack of a device present, and that the wrong type of device is connected. Further, in some embodiments, the FM tool is capable of performing any one or more of the above described operations within environments requiring intrinsic safety (e.g., hazardous environments where explosive gasses and dusts may be present).

Regarding image display, the FM tool may display images of the connection terminals on the FM tool and an indication of the appropriate terminals to be used when connected the FM tool, depending on the task and setting (e.g., depending on the measurement(s) to be performed and the communication protocol(s) used by the field device). By providing these images, the FM tool simplifies connecting the FM tool, minimizes user error, and minimizes the amount of user training required for users. In other embodiments, providing images such as showing the entire FM device, its terminals, and the process control device in various renderings may provide additional feedback and troubleshooting steps to further assist a user.

Regarding verification of a terminal connection to an externally powered loop or segment and the supplying of power at a terminal connection to an unpowered field device, the FM tool may perform voltage and current checks and may supply power to a loop or segment when appropriate. In some embodiments, when a user connects the FM tool to a FOUNDATION Fieldbus® segment or a HART® loop and attempts to initiate communication with a field device, the FM tool automatically checks for voltage on the segment or loop. By performing this voltage check, the FM tool verifies connection and polarity. Further, the voltage check enables the FM tool to detect whether the loop or segment is powered. If the loop or segment is configured for bus-power but is not providing power to the field device, the FM tool may provide the user with the option of powering the loop/segment from the FM tool. For example, if no external power is detected, the FM tool may prompt the user to select "Source Power" if desired. Further, when the voltage check reveals that power is available on the loop or segment, the FM tool may prevent application of additional power. Ensuring that power is not applied to a loop or segment that is already powered is critical to avoiding disturbing the loop or segment and preventing its proper operation.

Providing power to a powered segment or loop could cause damage to the power supply for the loop/segment or FM tool, or blow a fuse in the intrinsically safe barrier in the loop. Even once "Source Power" is initiated to provide power for loops with no external power, the FM tool will continue to perform background voltage and current checks to ensure excess power is not applied to the loop. If an alternative source of voltage or current is detected, the power provided by the FM tool is automatically shut down. If the FM tool detects a change outside of expected working conditions (e.g., power appears, power disappears, an over voltage or under voltage conditions is detected, an over current or under current conditions is detected, etc.), the FM tool may automatically shut-down power supplied to the loop/segment regardless of user interaction.

Regarding communication troubleshooting, the FM tool may listen for communication on a loop or segment to determine if a communication device is present and to determine if the FM tool has been correctly connected for the communication protocol associated with the loop or segment (e.g., HART® or FOUNDATION Fieldbus®). The FM tool may perform various functions if no communication is detected. For example, if no communication is detected on a HART® loop, the FM tool may present the user with an option to poll for devices on the loop. As another example, the FM tool may offer a user an option to increase loop resistance and guide the user through the process by displaying loop wiring diagrams, to ensure a hazard is not generated during the troubleshooting process.

In one embodiment, a method may be performed by a computer processor to detect the presence of a communicatively coupled path between the processor and a process control device, measure an electrical characteristic of the communicatively coupled path, and retrieve an electrical requirement of a communication protocol of the process control device from a memory device. The processor may calculate a deficiency between the electrical characteristic and the electrical requirement, retrieve an electrical mitigation that reduces the deficiency from the memory device, and render the electrical mitigation on a display device.

In another embodiment, a field maintenance tool includes a computer processor, a memory device, a display device, an electrical measurement sensor; and a communication connector. The processor may be configured to detect the presence of a communicatively coupled path between the processor, the communication connector, and a process control device. The tool measures an electrical characteristic of the communicatively coupled path, retrieves an electrical requirement of a communication protocol of the process control device, and calculates a deficiency between the electrical characteristic and the electrical requirement. Further, the tool retrieves an electrical mitigation that reduces the deficiency from the memory device, and renders the electrical mitigation on a display device.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Figure 1:
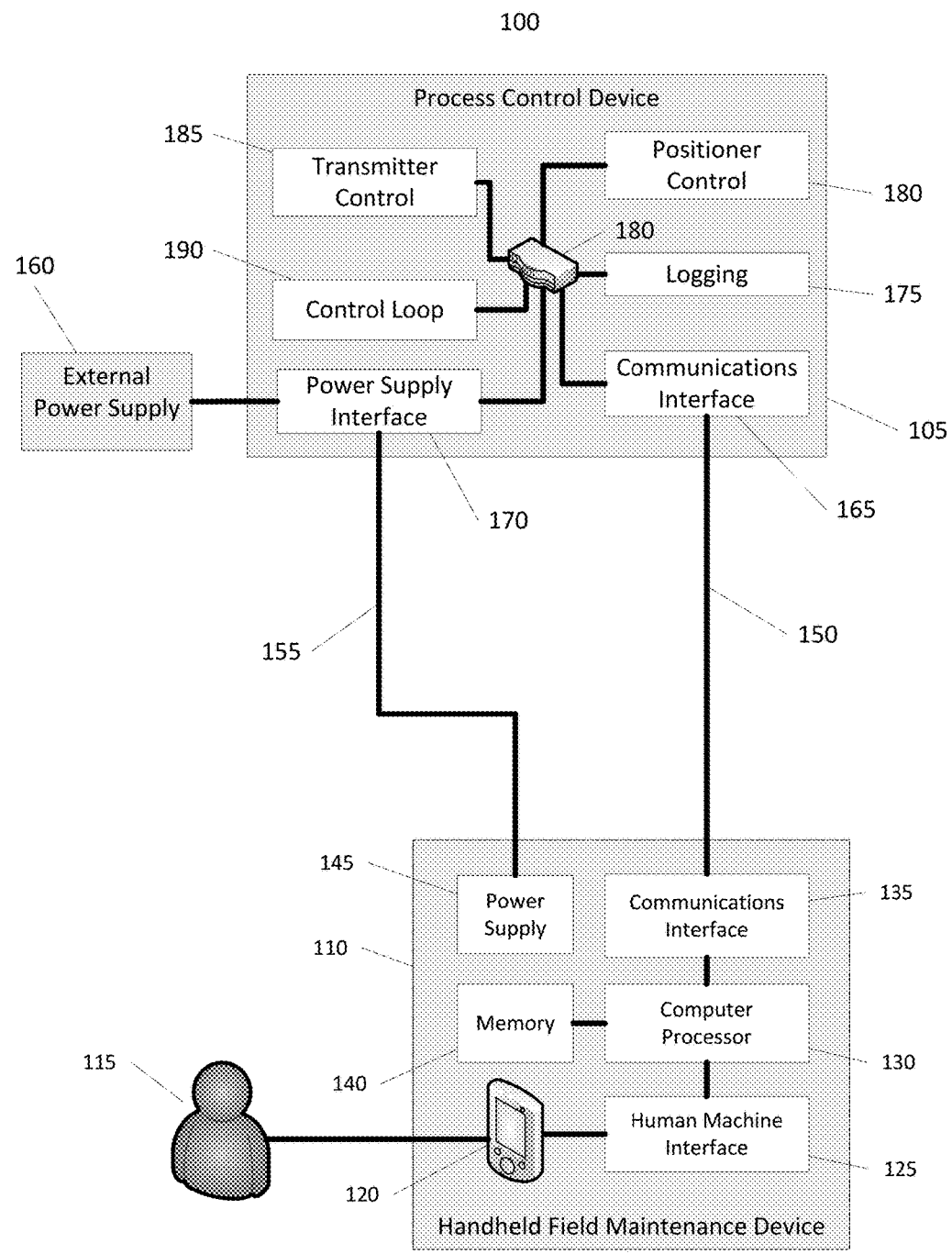
FIG. 1 illustrates a block diagram of a process control system, according to an embodiment of the present disclosure.

FIG. 1 illustrates a process control system 100, that includes a process control device 105, that may in some embodiments be a FOUNDATION Fieldbus® device, a HART® transmitter or positioner, or otherwise, according to an embodiment of the present disclosure. The process control device may communicatively couple through a set of wires, that may include communication wires 150 and/or powering wires 155, to a handheld field maintenance (FM) device 110, such as a Trex handheld maintenance tool. A user 115 may interact with the FM device 110 using a screen 120 that interfaces through a human-machine interface 125 to a computer processor 130. The computer processor 130 may interface to a memory 140 that stores processor executable instructions and data, and a communications interface 135 that communicatively couples to the communications wires 150. In some embodiments, the FM device 110 may include a power supply that may communicatively couple to the powering wires 155 to power the process control device 105. However, in other embodiments, the FM device 110 may not power the process control device 105, and power may be provided from an external power supply 160 to the process control device 105.

The process control device 105, that may in some embodiments include a FOUNDATION Fieldbus® device, a HART® transmitter or positioner, or another embodiment of a process control device may include a communications interface 165 that communicatively couples with the communications wires 150 and a power supply interface 170 that communicatively couples with the powering wires 155 and alternatively an external power supply 160. The process control device 105 may also include a control loop 190, logging capabilities 175, and alternatively transmitter controls 185 and positioner controls 180, depending on a configuration and application of the process control device 105. The internal components of the process control device 105 may intercommunicate using a message passing and controller device 180. Other embodiments may include some, all, or none of the illustrated devices within, thus the illustrated embodiment in FIG. 1 is exemplary in nature. Likewise, the FM device 110 may include some, all, or none of the illustrated devices within.

Figure 2:
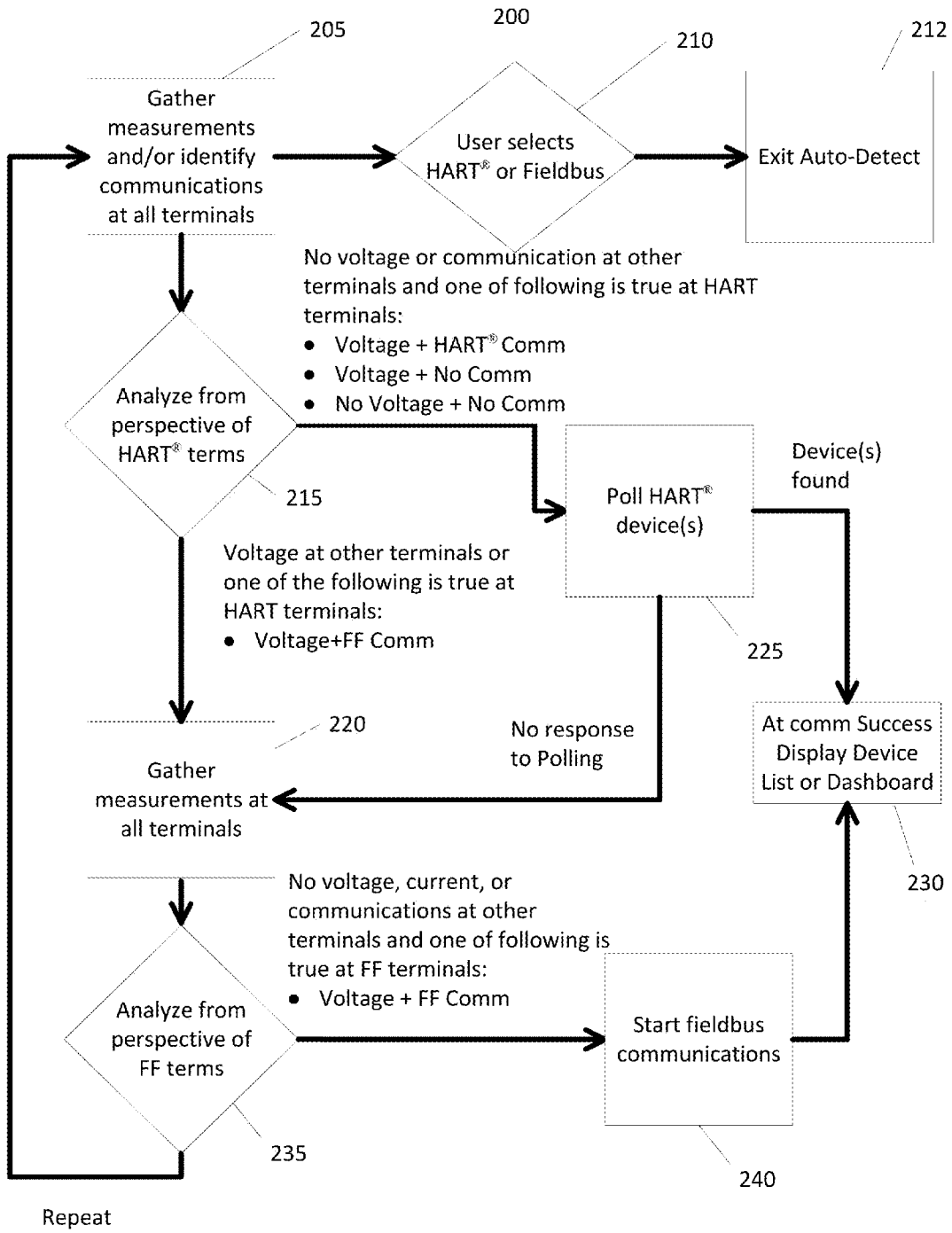
FIG. 2 illustrates a block diagram of a process to automatically detect a connection to a process control device, according to an embodiment of the present disclosure.

FIG. 2 illustrates a block diagram of a process to automatically detect a connection between, for example an FM device 110 of FIG. 1 and a process control device 105 of FIG. 1, according to an embodiment of the present disclosure. The processor 130, for example, may at block 205 gather measurements and/or identify communications at all terminals of the FM device 110 to determine the state of the connection. A user 115 may select at block 210 whether the process control device 105 is a HART® or FOUNDATION Fieldbus® device and the process may terminate at block 212. In an alternative embodiment, the processor 130 may analyze the connection from the perspective of a HART® device and may detect that no voltage or communication at other terminals and one of the following is true at the HART® terminals: a voltage is present, and HART® communication is detected or not detected, or no voltage is detected and no HART® communication is detected. Subsequently, the processor 130 may poll at block 225 for HART® devices, for example at address zero, or in another embodiment among a plurality of addresses, until a device is found or not found. In the embodiment wherein a device is found at block 225, the FM device may display an indication of communication success and display a device list or dashboard at block 230.

However, if no response to polling is received at block 225, the processor may at block gather measurements at all terminals. Another embodiment includes the processor 130 at block 215 detecting voltage at other terminals or the processor 130 detects voltage and FOUNDATION Fieldbus® communications and gathering measurements at all terminals at block 220. Thus, the processor 130 may analyze the electrical characteristics of the terminals of the FM device 110 at block 235 from the perspective of FOUNDATION Fieldbus® communications, and if a voltage and FOUNDATION Fieldbus® communications are detected, start FOUNDATION Fieldbus® communications at block 240 and at communications success display a device listing or dashboard at block 230. Alternatively, the processor 130 may repeat block 205 and gather measurements and/or identify communications at all terminals.

Figure 3:
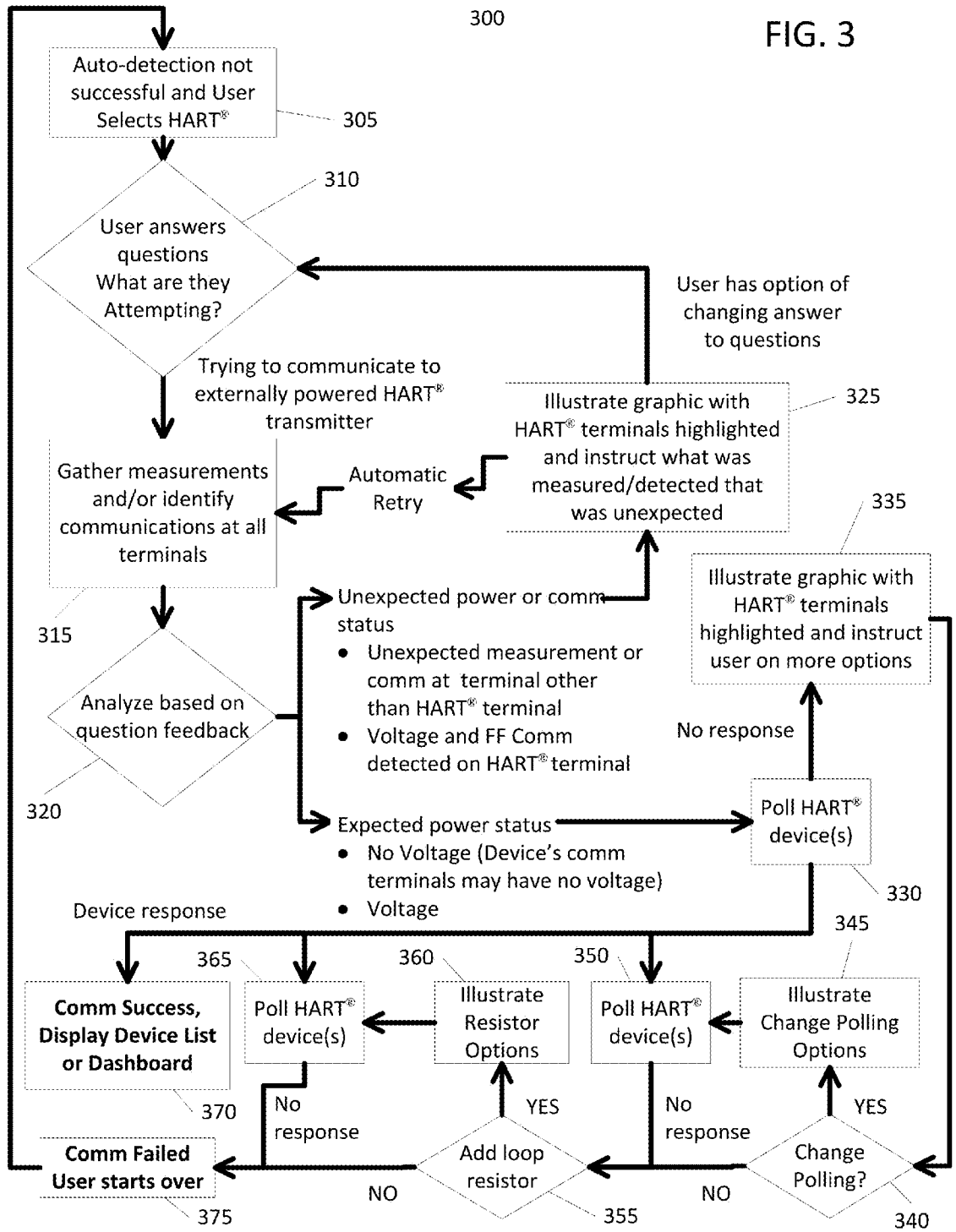
FIG. 3 illustrates a block diagram of a process to troubleshoot a connection to a HART® transmitter that is externally powered, according to an embodiment of the present disclosure.

FIG. 3 illustrates a block diagram 300 of a process to troubleshoot a connection to a HART® transmitter that is externally powered, according to an embodiment of the present disclosure. At block 305 the processor 130 determines that auto-detection, for example from the block diagram 200 of FIG. 2, was unsuccessful, and a user selects that the process control device 105 is a HART® device, for example at block 210 of FIG. 2. Thus, a user 115 may indicate to the processor 130 using the display 120 and human-machine interface 125 at block 310 that they do not intend to power the process control device 105 from the FM device 105, and that the process control device is a HART® transmitter. The processor 130 at block 315 may gather measurements and/or identify communications at all terminals of the FM device 105. Based on the measurements from block 315, the processor at 130 may analyze at 320 whether there is unexpected power or communications.

For example, the processor 130 may at block 320 detect an unexpected measurement or communication at a terminal other than a HART® terminal, or voltage and FOUNDATION Fieldbus® communications on a HART® terminal and thus illustrate a graphic at block 325, for example on the display 120, with HART® terminals highlighted and instructions related to what was measured and detected that was incorrect. The processor 130 may allow the user 115 at block 310 to change an answer to a question, such as intending to provide power from a Trex FM device 105, or whether the HART® device is a positioner or transmitter. An alternative embodiment includes at block 325 the processor automatically retrying the measurements and identifying communications at block 315, with the assumption that the user has changed hardware at block 325 in response to the illustrated graphic.

At block 320, based on the feedback from the user 115, the processor 130 may detect the expected power status, such as no voltage on the communications wires 150, or voltage present, and proceed to poll for HART® devices, using address zero or a plurality of addresses. In some embodiments, four wire process control devices 105 or battery powered HART® devices may not have a voltage at its communications terminals. In the event the processor 130 detects no response to the polling at block 330 the processor may at block 335 illustrate a graphic with HART® terminals highlighted and instructions for the user 115 to take additional troubleshooting steps. One such embodiment includes the processor 130 prompting the user 115 to change polling at 340, and if selected illustrate the change polling options at block 345, thus initiating polling for HART® devices at block 350. However, if no response is detected by the processor 130, the processor may in some embodiments illustrate an option to add a loop resistor at block 355 and illustrate resistor options at block 360. Adding a resistor may include further measurements and/or identifying communications at all terminals and re-analyzing based on the expected topology of a voltage and the Trex loop resistor. Subsequent polling at block 365 following resistor changes may further result in no response and allowing a user 115 to start the process over at block 375. At any point during polling for HART® devices at blocks 330, 350, and 365, the processor 130 may detect communications success at block 370 and display a device list or dashboard.

Figure 4:
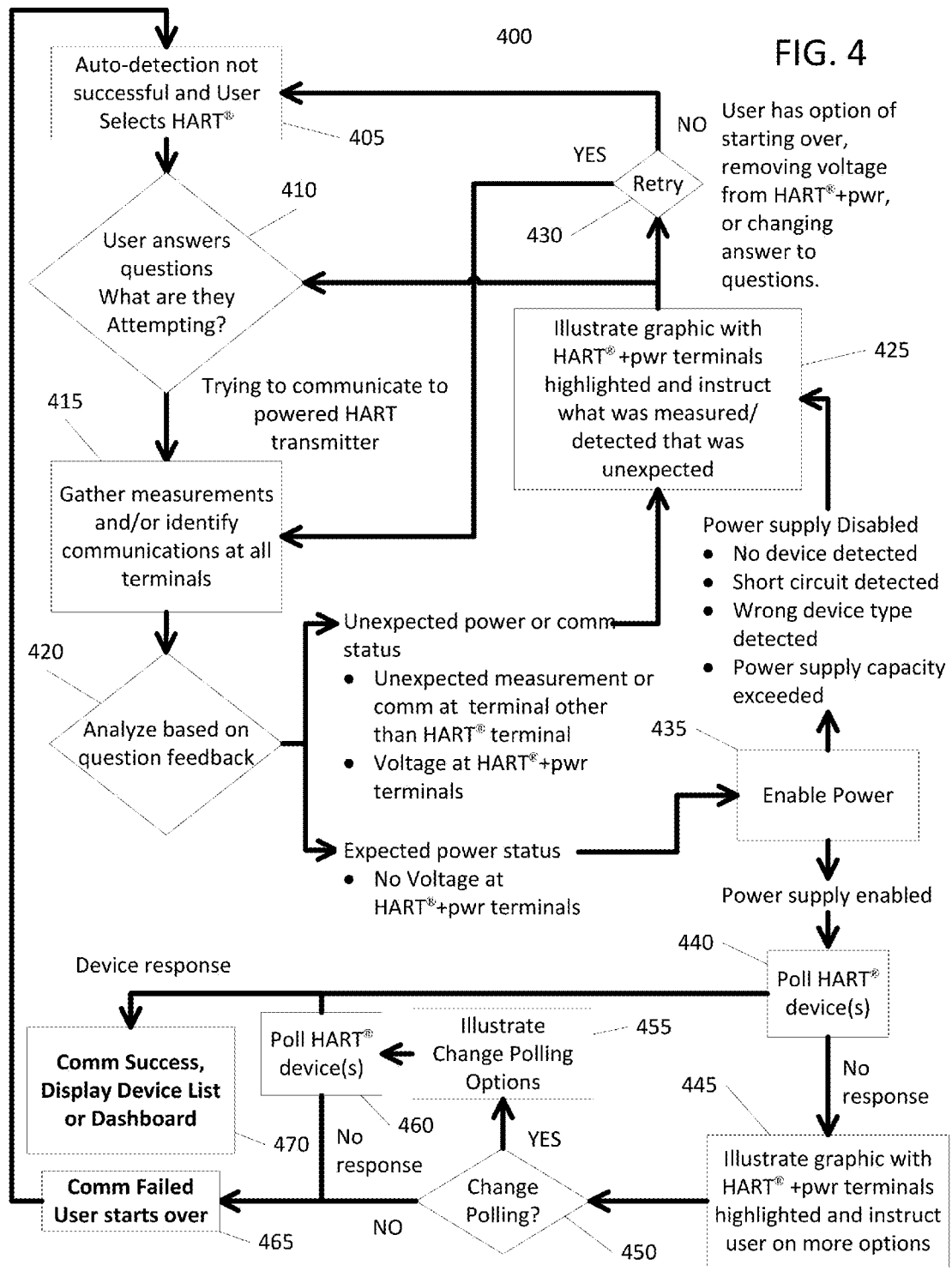
FIG. 4 illustrates a block diagram of a process to troubleshoot a connection to a HART® transmitter that is powered by a handheld field maintenance tool, according to an embodiment of the present disclosure.

FIG. 4 illustrates a block diagram of a process to troubleshoot a connection to a HART® transmitter that is powered by a handheld field maintenance tool, according to an embodiment of the present disclosure. At block 405, the processor 130 determines that auto-detection is unsuccessful and that the user 115 has selected that the process control device 105 is a HART® device. Subsequently, the processor 130 at block 410 determines that the user 115 has indicated that they intend to power the process control device 105 with the Trex FM device 110, for example through the powering wires 155, and that the HART® device is a transmitter. Thus, at block 415, the processor 130 gathers measurements and/or identifies communications at all terminals of the Trex FM device 110, for example using the power supply 145 and communications interface 135. Based on the measurements from block 415, the processor at block 420 analyzes the measurements based on the feedback in blocks 405 and 410 and may determine that there is unexpected measurement or communications other than a HART® terminal or a voltage at a HART®+power terminal, for example if the HART® device was receiving power from the external power supply 160.

Thus, the processor 130 may at block 425 illustrate a graphic with HART®+pwr terminals highlighted and instruct the user 115 what was measured and/or detected that was unexpected. The user 115 may indicate to the processor 130 at block 430 to either begin the process again at block 405, or retry measurements at block 415 with the same answers from blocks 405 and 410. In an alternative embodiment, the processor 130 may allow the user 115 to change their answers at block 410.

At block 420 the processor 130 may analyze the measurements from 415 to indicate expected power status, such as no voltage detected at the HART®+power terminal, and at block 435 enable power from the Trex FM device 105. If the processor 130 detects no device, a short circuit, an incorrect device, or that a power supply capacity is exceeded, the processor at block 425 may illustrate a graphic with HART®+pwr terminals highlighted and instruct the user 115 what was measured and/or detected that was unexpected. Alternatively, if the processor 130 detects that the power supply is enabled, the processor 130 may at block 440 poll for HART® devices, at address zero or a plurality of addresses. If no response to the polling occurs, at block 445 the processor 130 may illustrate a graphic with HART®+pwr terminals highlighted and instruct the user 115 on more options, such as changing polling at block 450. If the user 115 indicates to the processor 130 to change polling at block 450, the processor 130 at block 455 may illustrate changing polling options at block 455 and poll for hard devices at block 460. In the case wherein no response occurs to polling for devices, the processor 130 indicates that communications failed at block 465 and the process starts over. However, if in response to polling there is a response from a HART® device, the processor may display communications success and displays a device list or dashboard at block 470.

Figure 5:
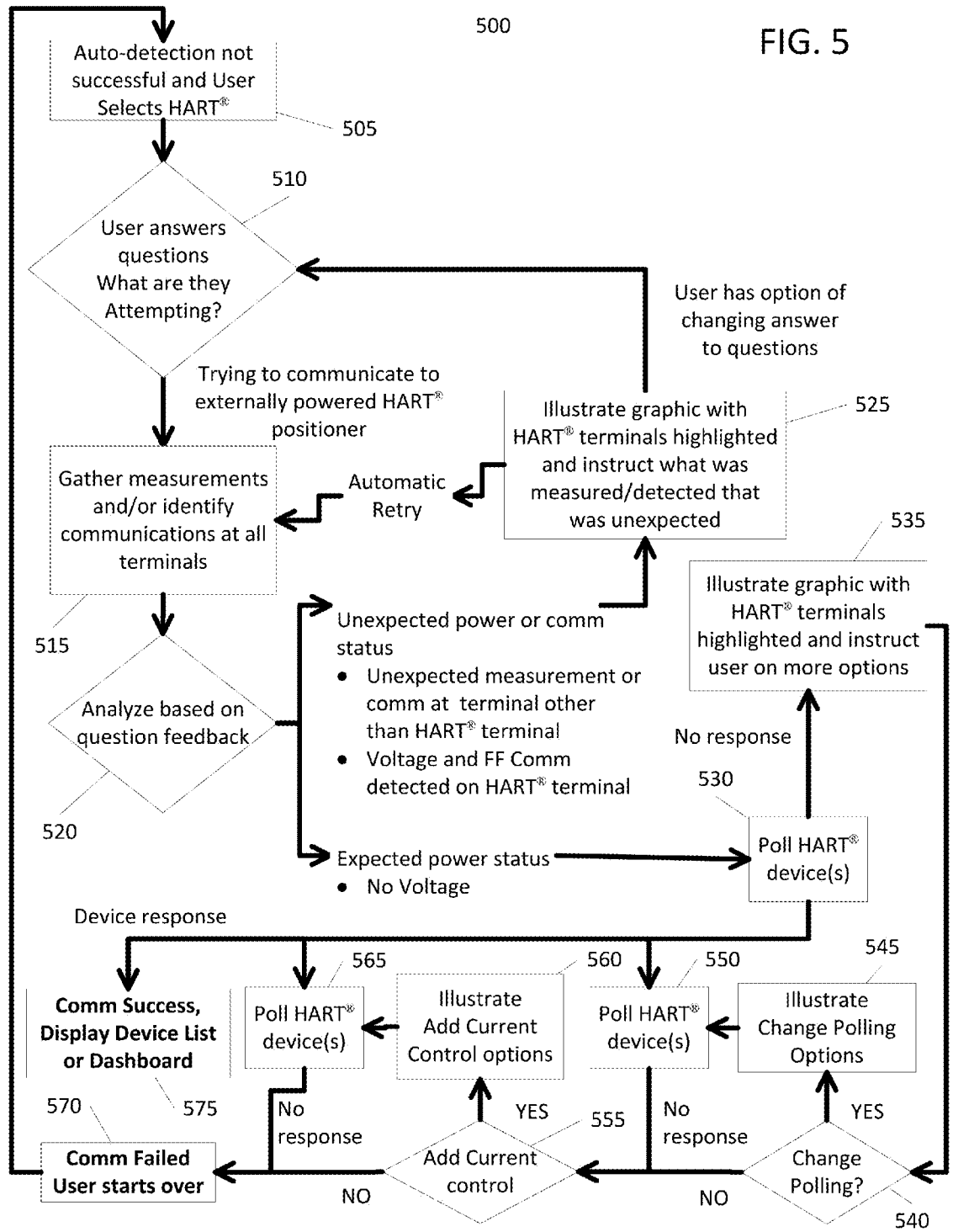
FIG. 5. illustrates a block diagram of a process to troubleshoot a connection to a HART® positioner that is externally powered, according to an embodiment of the present disclosure.

FIG. 5 illustrates a block diagram of a process to troubleshoot a connection to a HART® positioner that is externally powered, according to an embodiment of the present disclosure. At block 505 the processor 130 determines that auto-detection, for example from the block diagram 200 of FIG. 2, was unsuccessful, and a user selects that the process control device 105 is a HART® device, for example at block 210 of FIG. 2. Thus, a user 115 may indicate to the processor 130 using the display 120 and human-machine interface 125 at block 510 that they do not intend to power the process control device 105 from the FM device 105, and that the process control device is a HART® positioner. The processor 130 at block 515 may gather measurements and/or identify communications at all terminals of the FM device 105. Based on the measurements from block 515, the processor at 130 may analyze at 520 whether there is unexpected power or communications.

For example, the processor 130 may at block 520 detect an unexpected measurement or communication at a terminal other than a HART® terminal, or voltage and FOUNDATION Fieldbus® communications on a HART® terminal and thus illustrate a graphic at block 525, for example on the display 120, with HART® terminals highlighted and instructions related to what was measured and detected that was incorrect. The processor 130 may allow the user 115 at block 510 to change an answer to a question, such as intending to provide power from a Trex FM device 105, or whether the HART® device is a positioner or transmitter. An alternative embodiment includes at block 525 the processor automatically retrying the measurements and identifying communications at block 515, with the assumption that the user has changed hardware at block 525 in response to the illustrated graphic.

At block 520, based on the feedback from the user 115, the processor 130 may detect the expected power status, such as no voltage present, and proceed to poll for HART® devices at block 530, using address zero or a plurality of addresses. In the event the processor 130 detects no response to the polling at block 530 the processor may at block 535 illustrate a graphic with HART® terminals highlighted and instructions for the user 115 to take additional troubleshooting steps. One such embodiment includes the processor 130 prompting the user 115 to change polling at 540, and if selected illustrate the change polling options at block 545, thus initiating polling for HART® devices at block 550. However, if no response is detected by the processor 130, the processor may in some embodiments illustrate an option to add current control at block 555 and illustrate add current control options at block 560. Adding a current control may include further measurements and/or identifying communications at all terminals and re-analyzing based on the expected topology of a voltage and the Trex current control. Subsequent polling at block 565 following current changes may further result in no response and allowing a user 115 to start the process over at block 570. At any point during polling for HART® devices at blocks 530, 550, and 565, the processor 130 may detect communications success at block 575 and display a device list or dashboard.

Figure 6:
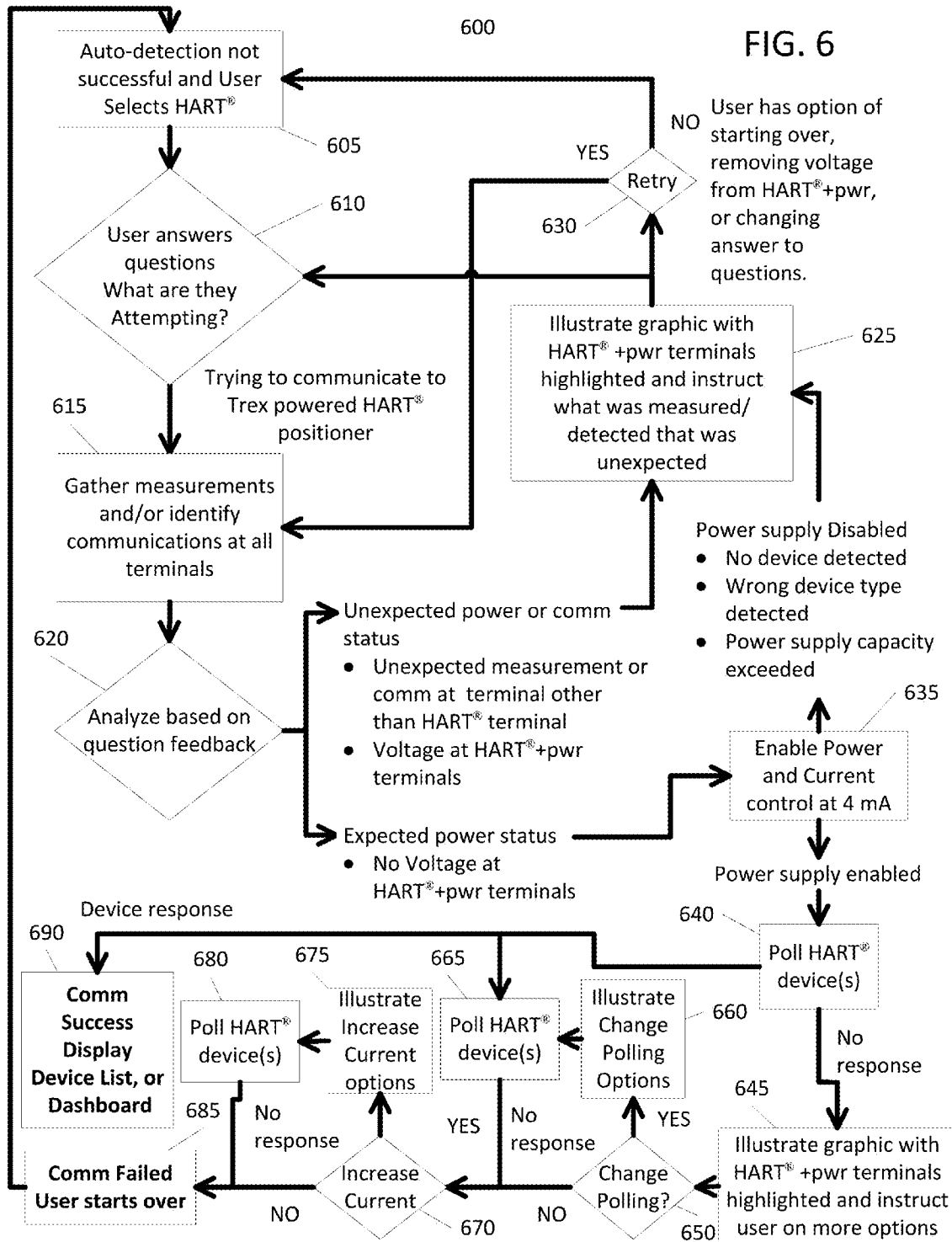
FIG. 6 illustrates a block diagram of a process to troubleshoot a connection to a HART® positioner that is powered by a handheld field maintenance tool, according to an embodiment of the present disclosure.

FIG. 6 illustrates a block diagram of a process to troubleshoot a connection to a HART® positioner that is powered by a handheld field maintenance tool, according to an embodiment of the present disclosure. At block 605, the processor 130 determines that auto-detection is unsuccessful and that the user 115 has selected that the process control device 105 is a HART® device. Subsequently, the processor 130 at block 610 determines that the user 115 has indicated that they intend to power the process control device 105 with the Trex FM device 110, for example through the powering wires 155, and that the HART® device is a positioner. Thus, at block 615, the processor 130 gathers measurements and/or identifies communications at all terminals of the Trex FM device 110, for example using the power supply 145 and communications interface 135. Based on the measurements from block 615, the processor at block 620 analyzes the measurements based on the feedback in blocks 605 and 610 and may determine that there is unexpected measurement or communications other than a HART® terminal or a voltage at a HART®+power terminal, for example if the HART® device was receiving power from the external power supply 160.

Thus, the processor 130 may at block 625 illustrate a graphic with HART®+pwr terminals highlighted and instruct the user 115 what was measured and/or detected that was unexpected. The user 115 may indicate to the processor 130 at block 630 to either begin the process again at block 605, or retry measurements at block 615 with the same answers from blocks 605 and 610. In an alternative embodiment, the processor 130 may allow the user 115 to change their answers at block 610.

At block 620 the processor 130 may analyze the measurements from 615 to indicate expected power status, such as no voltage detected at the HART®+power terminal, and at block 635 enable power and current control at 4 mA from the Trex FM device 105. If the processor 130 detects no device, an incorrect device type, or that a power supply capacity is exceeded, the processor at block 625 may illustrate a graphic with HART®+pwr terminals highlighted and instruct the user 115 what was measured and/or detected that was unexpected. Alternatively, if the processor 130 detects that the power supply is enabled, the processor 130 may at block 640 poll for HART® devices, at address zero or a plurality of addresses. If no response to the polling occurs, at block 645 the processor 130 may illustrate a graphic with HART® terminals highlighted and instruct the user 115 on more options, such as changing polling at block 650. If the user 115 indicates to the processor 130 to change polling at block 650, the processor 130 at block 665 may illustrate changing polling options and poll for HART® devices at block 665. In the case wherein no response occurs to polling for devices at block 665, the processor 130 may at block 670 allow the user 115 to increase current and illustrate at block 675 increase current options. If an increase current option may be selected at block 675, the processor 130 at block 680 may poll for HART® devices at block 680. In the case wherein at blocks 680 no response occurs to polling or the user 115 indicates to the processor 130 that increasing current is not selected, the processor 130 may display that communication has failed at block 685 and restart the process. However, if in response to polling there is a response from a HART® device, the processor may display communications success and displays a device list or dashboard at block 490.

Figure 7:
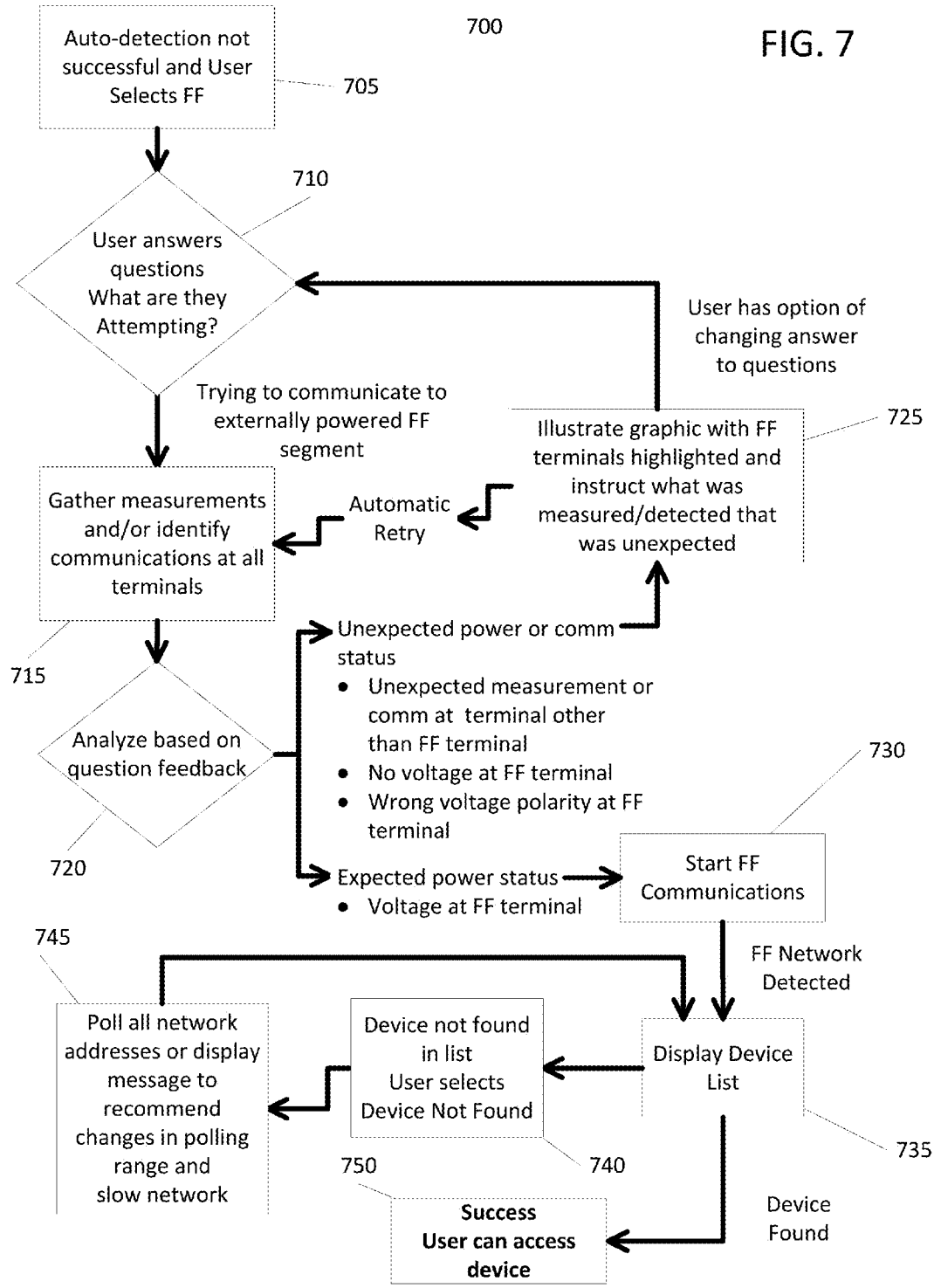
FIG. 7. illustrates a block diagram of a process to troubleshoot a connection to a FOUNDATION Fieldbus® device that is externally powered, according to an embodiment of the present disclosure.

FIG. 7 illustrates a block diagram of a process to troubleshoot a connection to a FOUNDATION Fieldbus® device that is externally powered, according to an embodiment of the present disclosure. At block 505 the processor 130 determines that auto-detection, for example from the block diagram 200 of FIG. 2, was unsuccessful, and a user selects that the process control device 105 is a FOUNDATION Fieldbus® device, for example at block 210 of FIG. 2. Thus, a user 115 may indicate to the processor 130 using the display 120 and human-machine interface 125 at block 510 that they do not intend to power the process control device 105 from the FM device 105. The processor 130 at block 715 may gather measurements and/or identify communications at all terminals of the FM device 105. Based on the measurements from block 715, the processor at 130 may analyze at 720 whether there is unexpected power or communications.

For example, the processor 130 may at block 720 detect an unexpected measurement or communication at a terminal other than a FOUNDATION Fieldbus® terminal, or no voltage at a FOUNDATION Fieldbus® terminal, or the wrong voltage polarity at a FOUNDATION Fieldbus® terminal and thus illustrate a graphic at block 725, for example on the display 120, with FOUNDATION Fieldbus® terminals highlighted and instructions related to what was measured and detected that was incorrect. The processor 130 may allow the user 115 at block 710 to change an answer to a question, such as intending to provide power from a Trex FM device 105. An alternative embodiment includes at block 725 the processor automatically retrying the measurements and identifying communications at block 715, with the assumption that the user has changed hardware at block 725 in response to the illustrated graphic.

At block 720, based on the feedback from the user 115, the processor 130 may detect the expected power status, such as a voltage at a FOUNDATION Fieldbus® terminal, and proceed to start FOUNDATION Fieldbus® communications at block 730.

In the event the processor 130 detects a FOUNDATION Fieldbus® network, the processor 130 at block 735 may display a device list. If the processor 130 finds a FOUNDATION Fieldbus® device at 750 the processor 130 may indicate that the user 115 may access the device. However, if a FOUNDATION Fieldbus® device is not found in the list the user 115 may indicate at block 740 to the processor 130 that the device is not found and at block 745 poll all network addresses and slow the network, thus returning to the display device list at block 735.

Figure 8:
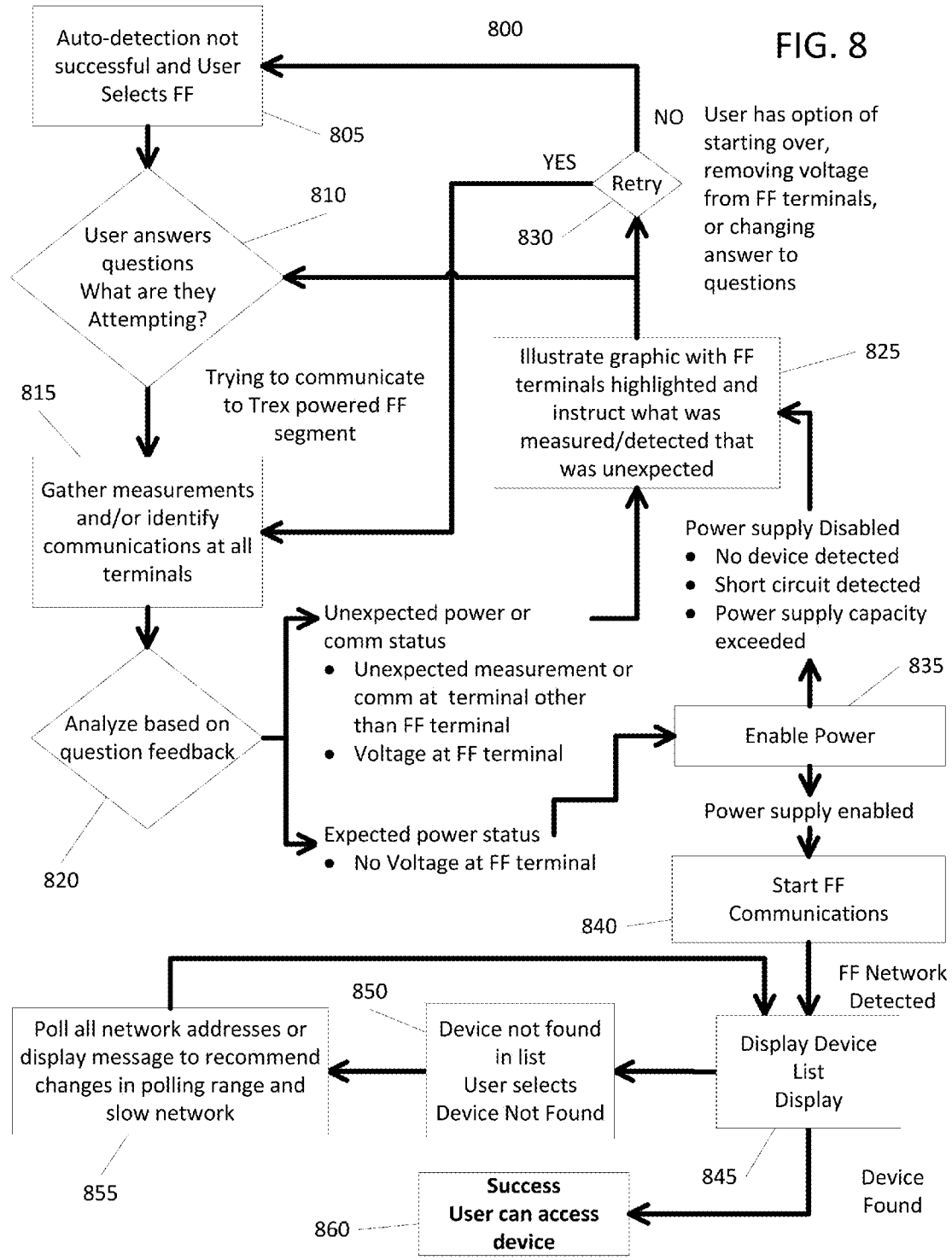
FIG. 8 illustrates a block diagram of a process to troubleshoot a connection to a FOUNDATION Fieldbus® device that is powered by a handheld field maintenance tool, according to an embodiment of the present disclosure.

FIG. 8 illustrates a block diagram of a process to troubleshoot a connection to a FOUNDATION Fieldbus® device that is powered by a handheld field maintenance tool, according to an embodiment of the present disclosure. At block 805, the processor 130 determines that auto-detection is unsuccessful and that the user 115 has selected that the process control device 105 is a FOUNDATION Fieldbus® device. Subsequently, the processor 130 at block 810 determines that the user 115 has indicated that they intend to power the process control device 105 with the Trex FM device 110, for example through the powering wires 155. Thus, at block 815, the processor 130 gathers measurements and/or identifies communications at all terminals of the Trex FM device 110, for example using the power supply 145 and communications interface 135. Based on the measurements from block 815, the processor at block 820 analyzes the measurements based on the feedback in blocks 805 and 810 and may determine that there is unexpected measurement or communications at a terminal other than a FOUNDATION Fieldbus® or a voltage at a FOUNDATION Fieldbus®, for example if the FOUNDATION Fieldbus® was receiving power from the external power supply 160.

Thus, the processor 130 may at block 825 illustrate a graphic with FOUNDATION Fieldbus®+pwr terminals+ highlighted and instruct the user 115 what was measured and/or detected that was unexpected. The user 115 may indicate to the processor 130 at block 830 to either begin the process again at block 805, or retry measurements at block 815 with the same answers from blocks 805 and 810. In an alternative embodiment, the processor 130 may allow the user 115 to change their answers at block 810.

At block 820 the processor 130 may analyze the measurements from 815 to indicate expected power status, such as no voltage detected at the FOUNDATION Fieldbus® terminal, and at block 835 enable power from the Trex FM device 105. If the processor 130 detects no device, a short circuit, or that a power supply capacity is exceeded, the processor at block 825 may illustrate a graphic with FOUNDATION Fieldbus®+pwr terminals highlighted and instruct the user 115 what was measured and/or detected that was unexpected. Alternatively, if the processor 130 detects that the power supply is enabled, the processor 130 may at block 840 proceed to start FOUNDATION Fieldbus® communications.

In the event the processor 130 detects a FOUNDATION Fieldbus® network, the processor 130 at block 845 may display a device list. If the processor 130 finds a FOUNDATION Fieldbus® device at 860 the processor 130 may indicate that the user 115 may access the device. However, if a FOUNDATION Fieldbus® device is not found in the list the user 115 may indicate at block 850 to the processor 130 that the device is not found and at block 855 poll all network addresses and slow the network, thus returning to the display device list at block 845.

Figure 9:
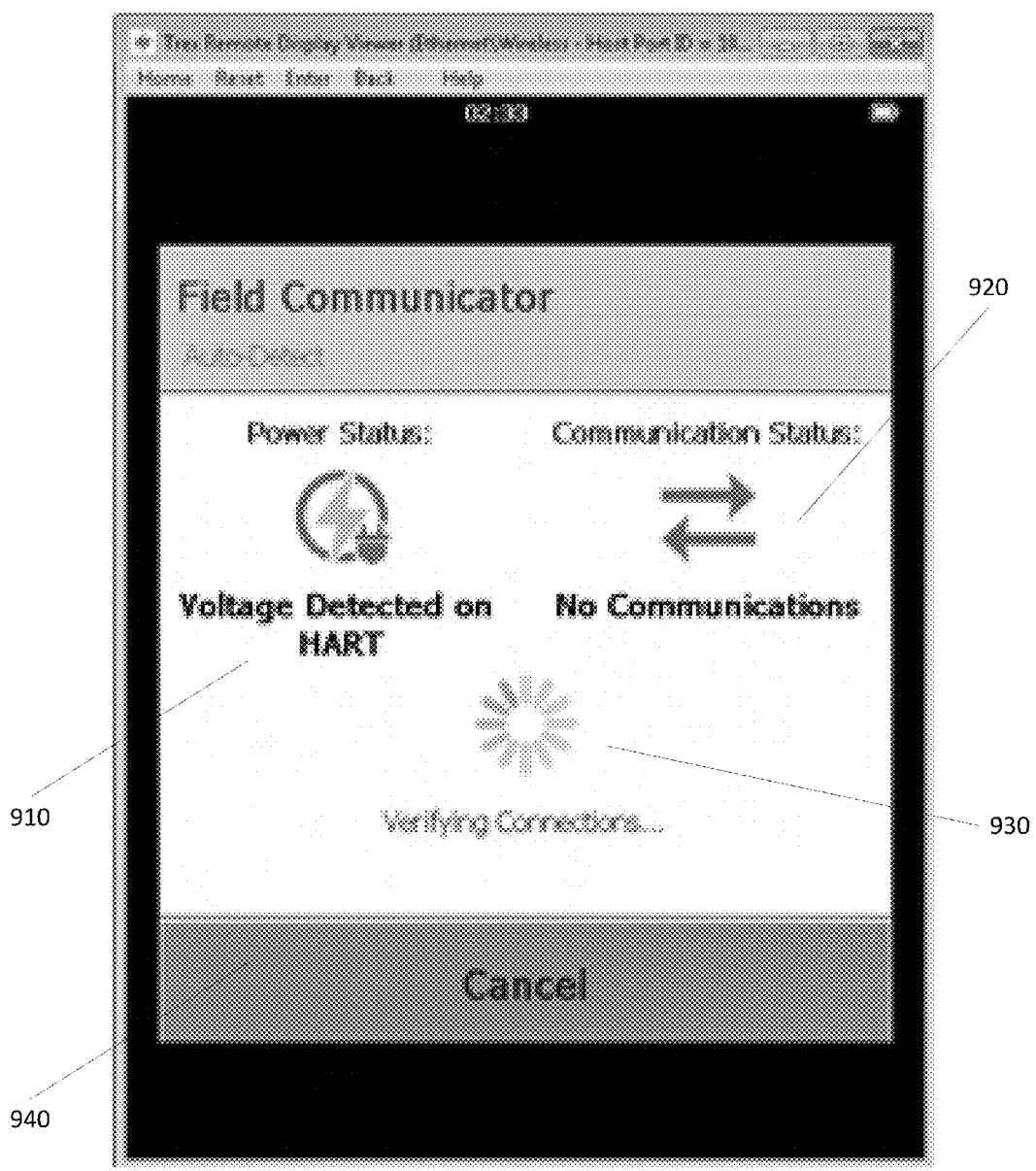
FIG. 9 illustrates an exemplary status screen, according to an embodiment of the present disclosure.

FIG. 9 includes an embodiment of a graphical interface window 900, for example illustrated by the processor 130 for a user 115. In the window 900, the processor 130 illustrates that voltage is detected 910 on the HART® device, for example the process control device 105, however communications cannot be established 920 with the process control device 105. The exemplary window 900 includes an indication 930 that the processor 130 within the FM device 110 is attempting to verify the connections between the FM device 110 and the process control device 105. Furthermore, the window 900 includes an option for a user 115 to indicate to the processor 130 that the connection process should be terminated with a cancel button 940. The illustrated window 900 may in some embodiments correspond to block 215 of FIG. 2. In some embodiments the power and voltage status may be updated at a rate of once per second with the expectation that a user 115 may modify the hardware in response to prompts by the FM device 110. However, in another embodiment when hardware is modified while providing power from the FM device 110, the troubleshooting process may start over.

Figure 10:
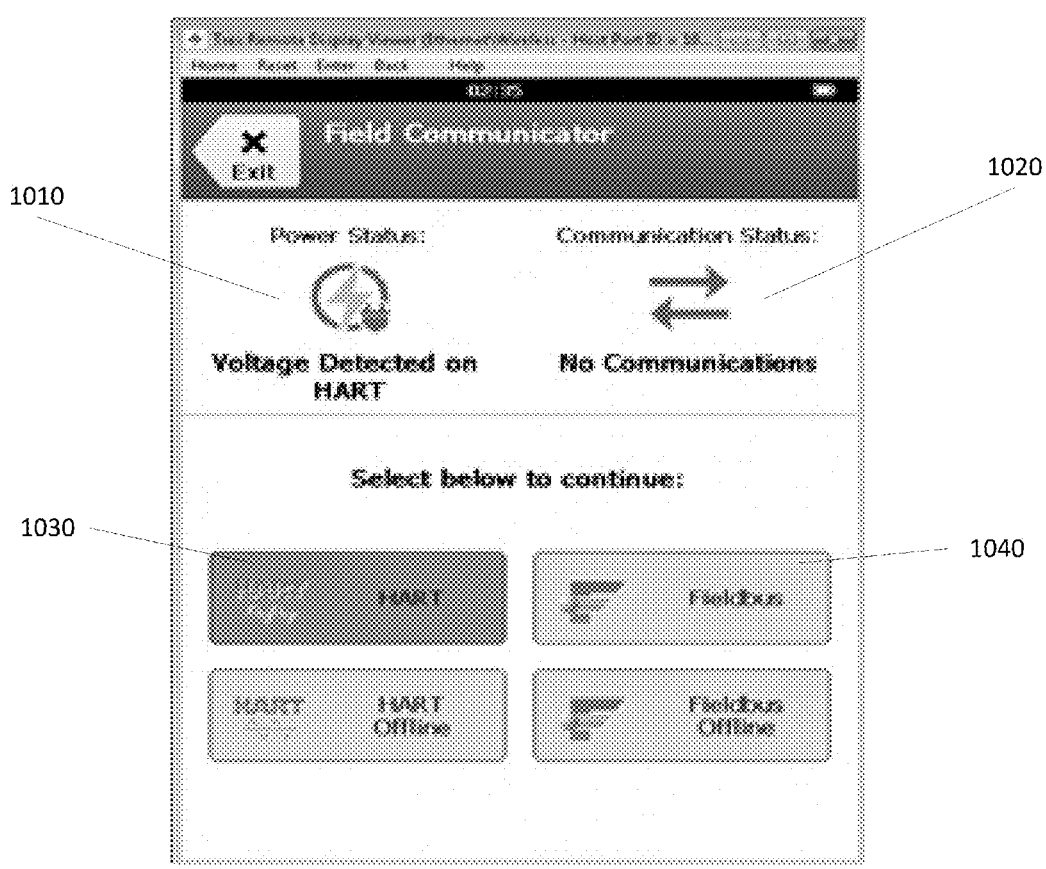
FIG. 10 illustrates an exemplary status screen with connection options, according to an embodiment of the present disclosure.

FIG. 10 includes an embodiment of a graphical interface window 1000, for example illustrated by the processor 130 for a user 115. The window 1000 includes indications that power was detected 1010 within a HART® device however communications have not been established 1020. Window 1000 includes interfaces for a user 115 to indicate to the processor 130 of the FM device 105 that the process control device complies with the HART® protocol 1030 or the FOUNDATION Fieldbus® protocol 1040. The illustrated window 1000 may in some embodiments correspond to block 210 of FIG. 2. In some embodiments, the window 1000 may dynamically update as the auto-detect feature continues to run. Thus, while displaying window 1000, a user 115 may connect a process control device 105 at any point in the future.

Figure 11:
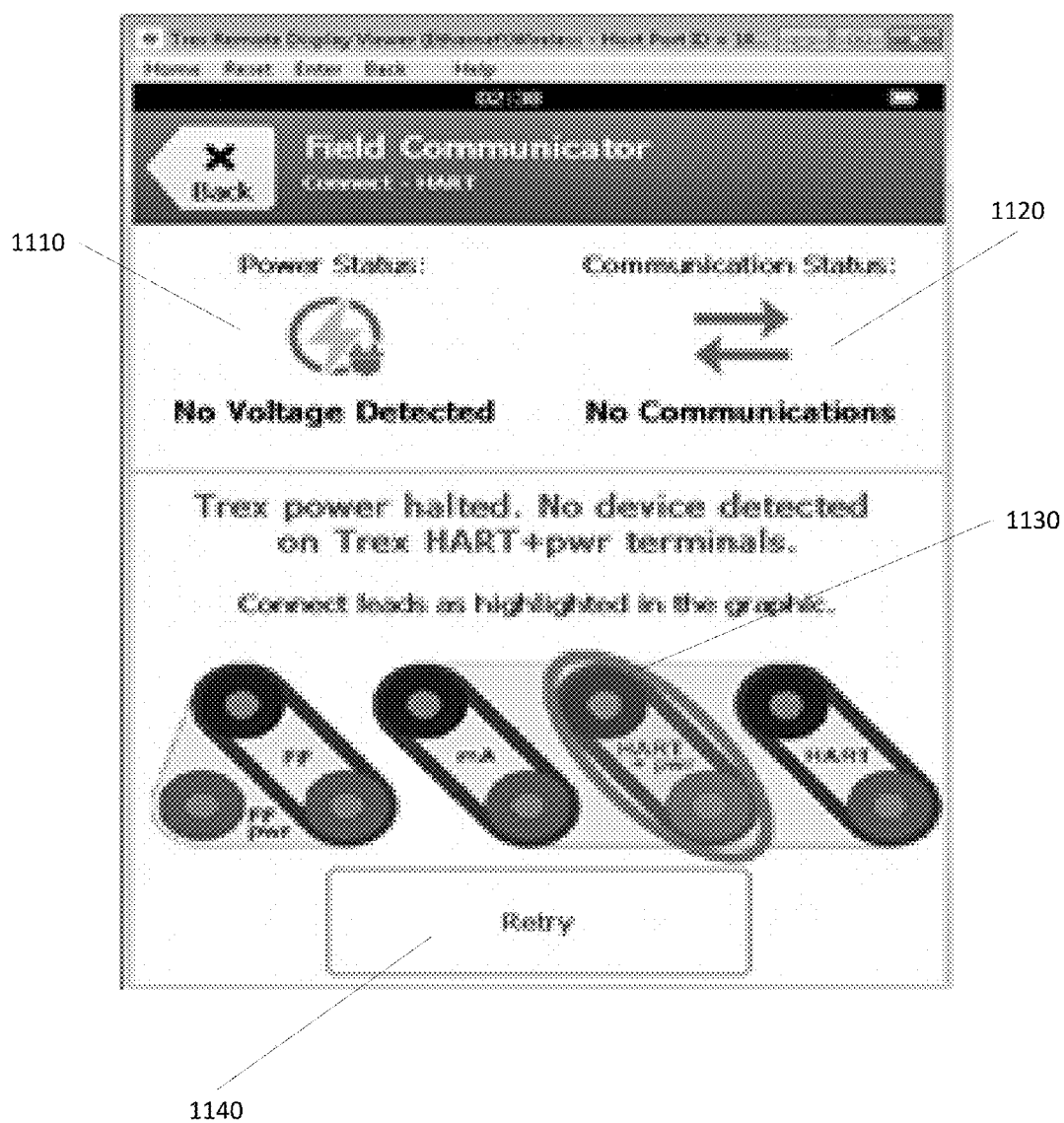
FIG. 11 illustrates an exemplary HART® connection check screen, according to an embodiment of the present disclosure.

FIG. 11 includes an embodiment of a graphical interface window 1100, for example illustrated by the processor 130 for a user 115, that may in some embodiments correspond to block 425 of FIG. 5 and block 625 of FIG. 6. Window 1100 includes an indication 1110 that voltage is not detected, and communications are not established 1120. Furthermore, window 1100 includes pictorial illustrations created by the processor 130 that show the appropriate power and ground connections 1130 for a Trex powered HART® device. A retry button 1140 allows the processor 130 to detect an indication from the user 115 intends to repeat the powering process, for example once the wiring has been modified.

Figure 12:
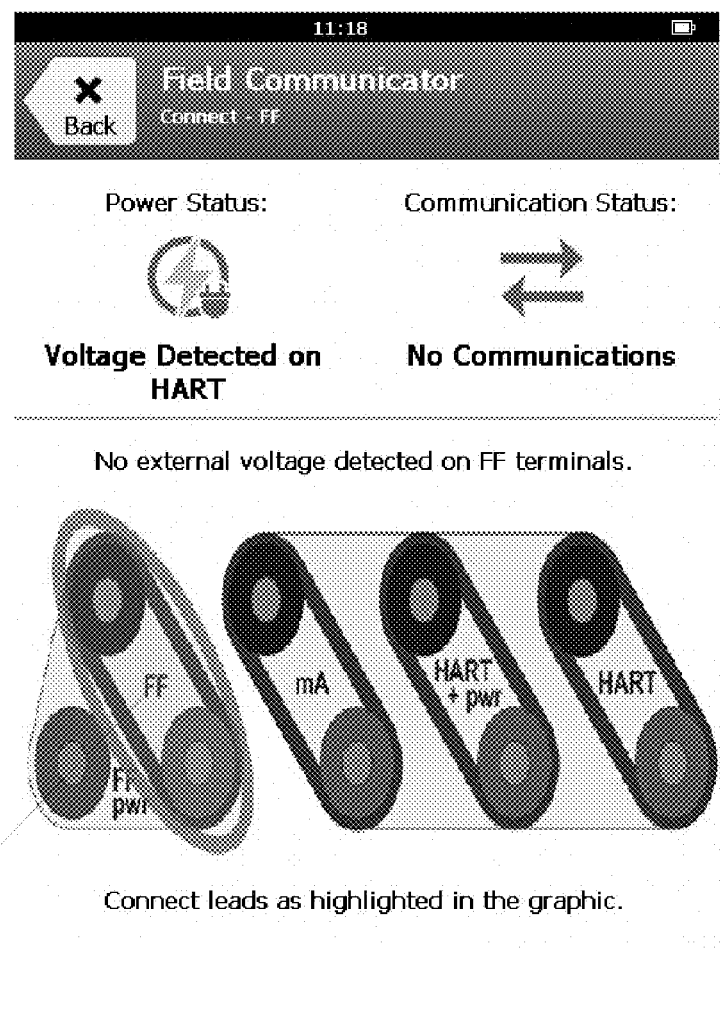
FIG. 12 illustrates an exemplary FOUNDATION Fieldbus® connection instructional screen, according to an embodiment of the present disclosure.

FIG. 12 illustrates an exemplary FOUNDATION Fieldbus® connection instructional screen 1200, according to an embodiment of the present disclosure. In one embodiment, the screen 1200 corresponds to block 725 of FIG. 7. The screen 1200 includes an illustrated instruction to connect to a FOUNDATION Fieldbus® device powered by, for example, an externally powered FOUNDATION Fieldbus® segment.

Figure 13:
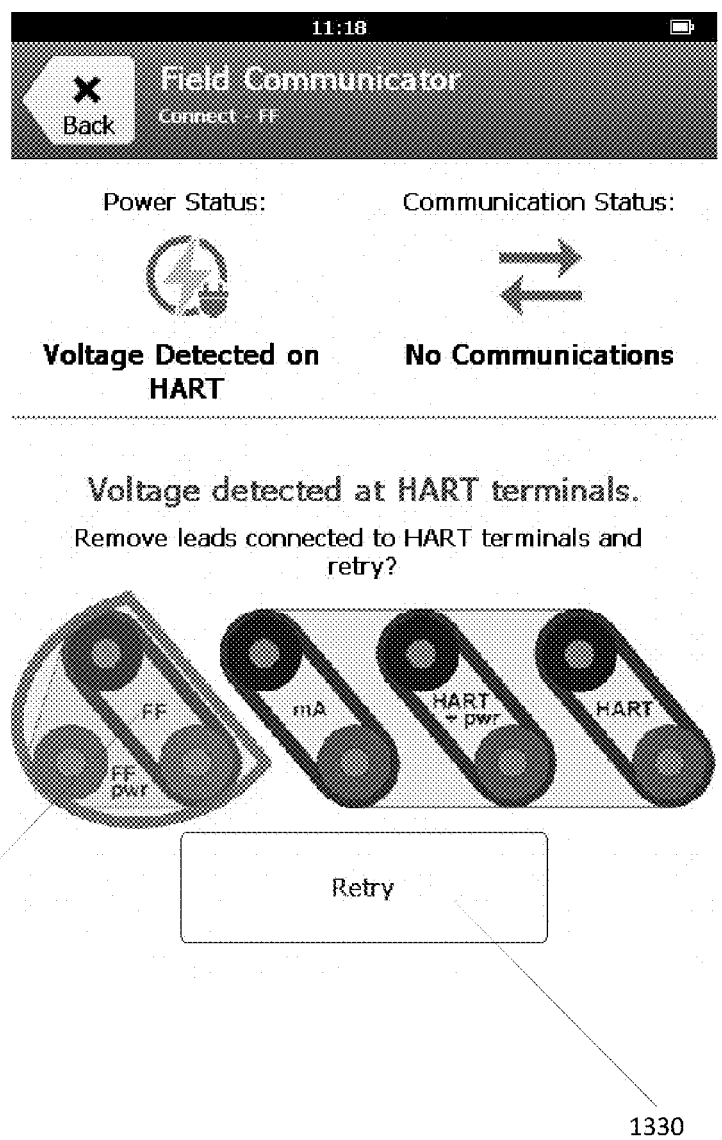
FIG. 13 illustrates an alternative exemplary FOUNDATION Fieldbus® connection instructional screen, according to an embodiment of the present disclosure.

FIG. 13 illustrates an alternative exemplary FOUNDATION Fieldbus® connection instructional screen 1300, according to an embodiment of the present disclosure. In one embodiment, the screen 1300 corresponds to block 825 of FIG. 8. The screen 1300 includes an illustrated instruction 1320 to connect to an un-powered FOUNDATION Fieldbus® device and that there is voltage detected at HART® terminals that should not be present when a user is attempting to power a FOUNDATION Fieldbus® device. The instructional screen 1300 includes a retry button 1330 that the processor 130 detects to return to block 715 of FIG. 7.

Figure 14:
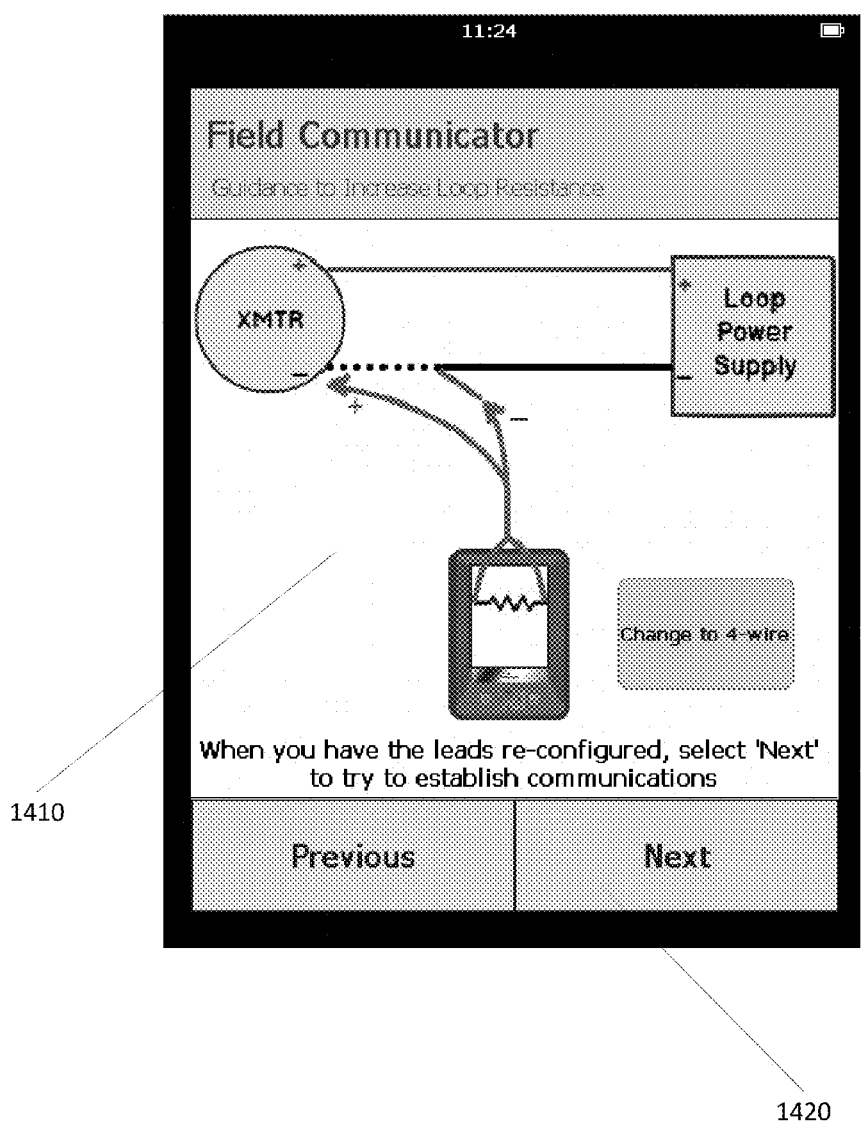
FIG. 14 illustrates an exemplary loop resistance modification instructional screen for a two-wire system, according to an embodiment of the present disclosure.

FIG. 14 illustrates an exemplary loop resistance modification instructional screen 1400 for a four-wire system, according to an embodiment of the present disclosure. In one embodiment, the screen 1400 corresponds to block 360 of FIG. 3. The screen 1400 includes wiring diagrams 1410 for a four-wire configuration between the FM device 110 and a HART® device and the ability to continue with a next button 1420 once wiring modifications have been made.

Figure 15:
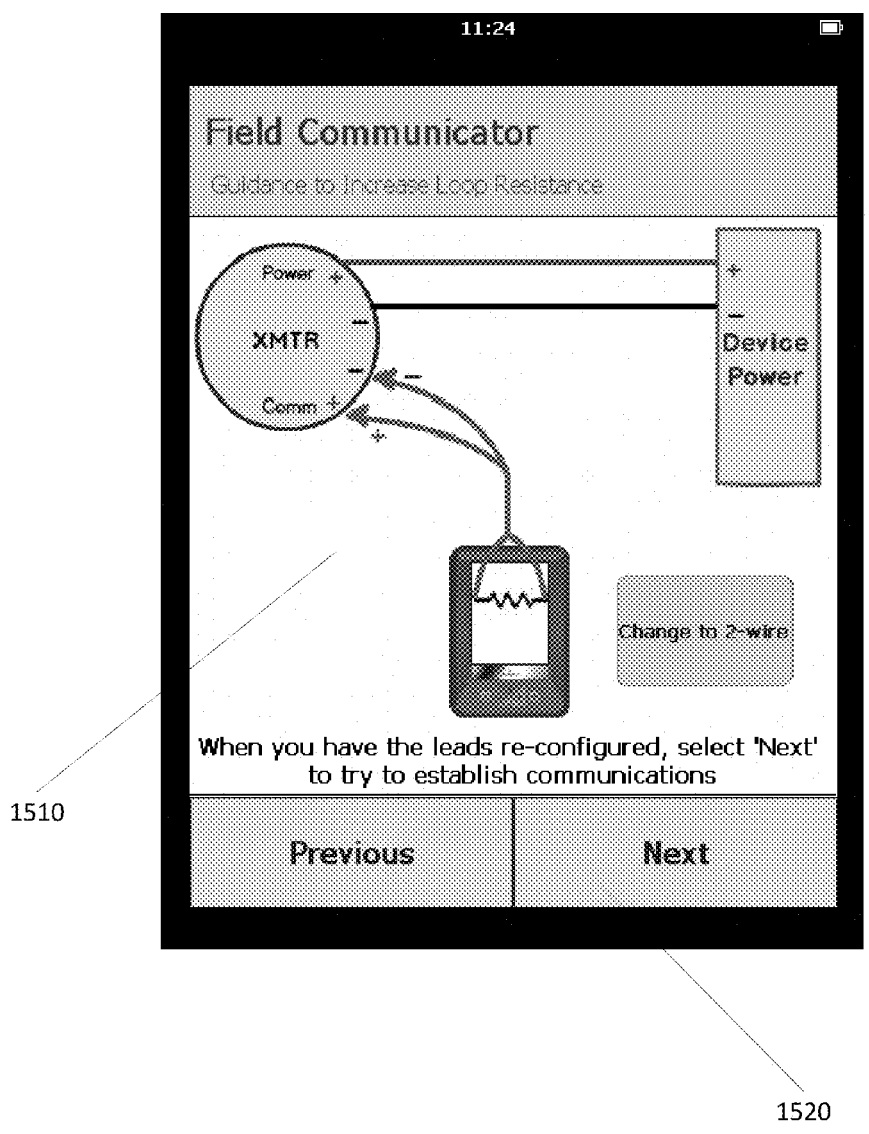
FIG. 15 illustrates an exemplary loop resistance modification instructional screen for a four-wire system, according to an embodiment of the present disclosure.

FIG. 15 illustrates an exemplary loop resistance modification instructional screen 1500 for a two-wire system, according to an embodiment of the present disclosure. In one embodiment, the screen 1500 corresponds to block 360 of FIG. 3. The screen 1500 includes wiring diagrams 1510 for a two-wire configuration between the FM device 110 and a HART® device and the ability to continue with a next button 1520 once wiring modifications have been made.

Figure 16:
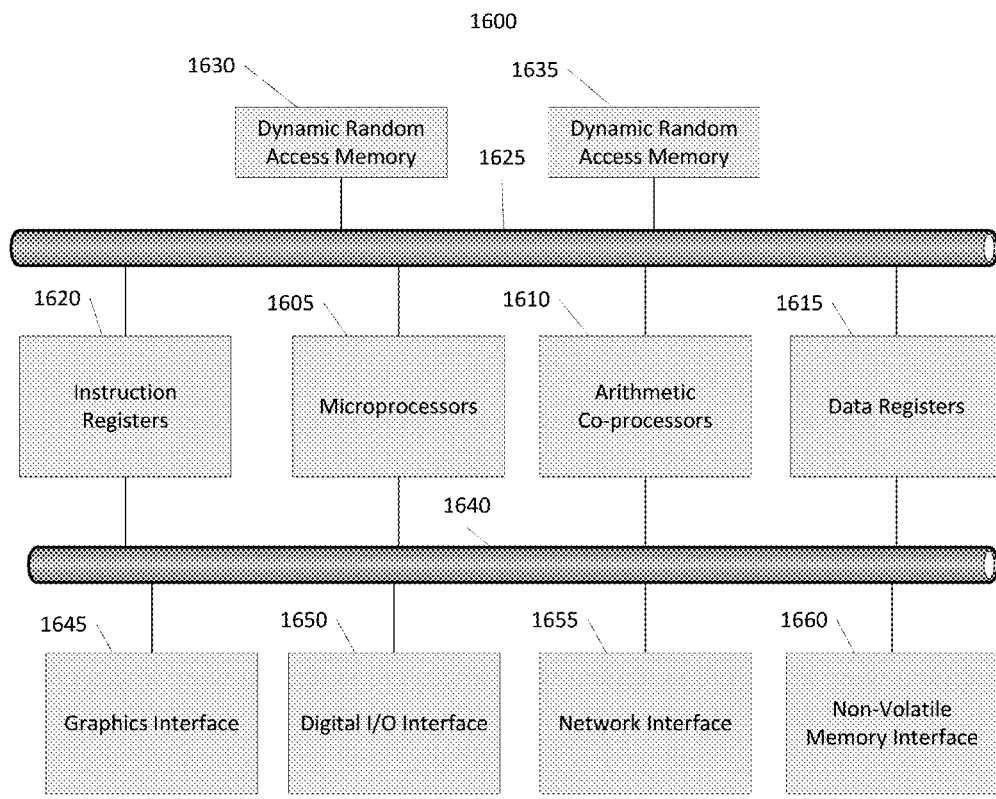
FIG. 16 illustrates an exemplary computing system, according to an embodiment of the present disclosure.

FIG. 16 illustrates an exemplary computing system 1600, that includes one or more microprocessors 1605, coupled to supporting devices through multi-access busses 1625 and 1640. Such a computing system may reside within the process control device 105, within the FM device 110, to communicate and control elements of a process control plant. Dynamic random access memory 1630 and 1635 may interface to data bus 1625, and store data used by the one or more microprocessors 1605. The system 1600 includes instruction registers 1620 that store executable instructions for the one or more microprocessors 1605, and data registers 1615 that store data for execution.

In some embodiments, the system 1600 includes one or more arithmetic co-processors 1610, to assist or supplement the one or more microprocessors 1605. Data bus 1640 includes interfaces to a graphics interface 1645 that may in some embodiments process and transmit graphical data for a user on a display or similar devices. Likewise, data bus 1640 includes interfaces for a digital I/O interface that processes and transmits, for example, keyboard, pointing device, and other digital and analog signals produced and consumed by users or other machines. A network interface 1655 processes and transmits encoded information over wired and wireless networks to connect the system 1600 to other machines and users. Data bus 1640 also includes at least one interface to a non-volatile memory interface, that may process and transmit data that resides on non-volatile memory devices.

Figure 17:
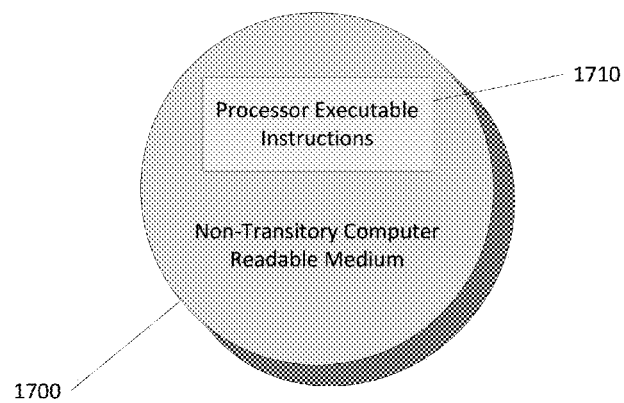
FIG. 17 illustrates a non-transitory computer readable medium, according to an embodiment of the present disclosure.

FIG. 17 illustrates a non-transitory computer readable medium 1700, that comprises processor executable instructions 1710. Such processor executable instructions may include instructions executed by the one or more processors 130 of FIG. 1, and/or one or more microprocessors 1605 of FIG. 16.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A method performed by a computer processor, comprising:
    detecting the presence of a communicatively coupled path between the processor and a process control device;
    measuring an electrical characteristic of the communicatively coupled path;
    retrieving an electrical requirement of a communication protocol of the process control device from a memory device;
    calculating a deficiency in the presence of the communicatively coupled path, and between the electrical characteristic and the electrical requirement;
    retrieving an electrical mitigation that reduces the deficiency from the memory device; and
    rendering the electrical mitigation on a display device.

2. The method of claim 1, wherein the electrical characteristic comprises a voltage on the communicatively coupled path, and wherein the electrical requirement comprises a voltage required within the process control device.

3. The method of claim 2, wherein the deficiency comprises an electrical potential insufficient to properly operate the process control device, and wherein the electrical mitigation comprises supplying a voltage to the process control device that meets the electrical requirement.

4. The method of claim 3, wherein the deficiency comprises a power supply capacity has been exceeded, and wherein the electrical mitigation comprises reducing the number of devices sources from the power supply or removing a current limitation of the power supply.

5. The method of claim 3, wherein the deficiency comprises a wire in the communicatively coupled path is shorted, and wherein the electrical mitigation comprises replacing a wire in the communicatively coupled path.

6. The method of claim 2, wherein the electrical mitigation further comprises modifying a wiring configuration in the communicatively coupled path, and wherein the processor renders wiring instructions on the display device.

7. The method of claim 6, wherein the wiring instructions comprise an illustration of proper wiring connections on a process control device.

8. The method of claim 1, wherein the electrical characteristic comprises a resistance associated with the communicatively coupled path.

9. The method of claim 8, wherein the deficiency comprises an resistance associated with the communicatively coupled path insufficient to support communication between the processor and the process control device, and wherein the electrical mitigation comprises modifying a resistance in the communicatively coupled path to allow communication between the processor and the process control device.

10. The method of claim 9, wherein the electrical mitigation comprises modifying an electrical current associated with the communicatively coupled path to: (i) enable an actuator device to function and communicate or to (ii) move an actuator device.

11. The method of claim 10, wherein the processor renders an option to modify the resistance associated with the communicatively coupled path on the display device.

12. The method of claim 1, wherein the processor is contained within a field maintenance tool compliant with a Highway Addressable Remote Transducer protocol, and wherein the field maintenance tool is configured to detect FOUNDATION Fieldbus communications using a Fast Fourier Transform.

13. The method of claim 12, further comprising detecting a lack of analog or digital communications on a communications loop, and wherein the electrical mitigation comprises polling for devices on a communications loop.

14. The method of claim 13, wherein the electrical mitigation comprises at least one of adding 167 ohms of resistance to the communicatively coupled path, adding 250 ohms of resistance to the communicatively coupled path, and adding 500 ohms of resistance to the communicatively coupled path.

15. The method of claim 1, wherein the processor is contained within a field maintenance tool compliant with a FOUNDATION Fieldbus protocol.

16. The method of claim 15, further comprising providing a voltage from the field maintenance tool to the process control device.

17. The method of claim 16, wherein the deficiency comprises a voltage above a threshold set by the electrical requirement, and wherein the process control device is compliant with a FOUNDATION Fieldbus protocol.

18. The method of claim 17, wherein the electrical mitigation comprises disabling an attempt to provide a voltage from the field maintenance tool to the process control device.

19. The method of claim 16, wherein the deficiency comprises at least one of (i) a voltage of opposite polarity set by the electrical requirement, (ii) no device detected, (iii) short circuit detected, and (iv) power supply capacity exceeded.

20. The method of claim 19, wherein the electrical mitigation comprises at least one of reversing the polarity of a voltage provided by the field maintenance tool, or the processor rendering an illustration on the display device to modify the wiring providing voltage from the field maintenance tool to the process control device.

21. A field maintenance tool comprising:
    a computer processor;
    a memory device;
    a display device;
    an electrical measurement sensor; and
    a communication connector;
    wherein the processor is configured to:
        detect the presence of a communicatively coupled path between the processor, the communication connector, and a process control device;
        measure, with the electrical measurement sensor, an electrical characteristic of the communicatively coupled path;

retrieve, from the memory device, an electrical requirement of a communication protocol of the process control device;
calculate a deficiency between the electrical characteristic and the electrical requirement;
retrieve an electrical mitigation that reduces the deficiency from the memory device; and
render the electrical mitigation on a display device.

22. The tool of claim 21, wherein the electrical characteristic comprises a voltage on the communicatively coupled path, and wherein the electrical requirement comprises a voltage required within the process control device.

23. The tool of claim 22, wherein the deficiency comprises an electrical potential insufficient to properly operate the process control device, and wherein the electrical mitigation comprises supplying a voltage to the process control device that meets the electrical requirement.

24. The tool of claim 23, wherein the electrical mitigation further comprises modifying a wiring configuration in the communicatively coupled path, and wherein the processor renders wiring instructions on the display device.

25. The tool of claim 24, wherein the wiring instructions comprise an illustration of proper wiring connections on a process control device.

26. The tool of claim 23, wherein the deficiency comprises a power supply capacity has been exceeded, and wherein the electrical mitigation comprises reducing the number of devices sources from the power supply or removing a current limitation of the power supply.

27. The tool of claim 23, wherein the deficiency comprises a wire in the communicatively coupled path is shorted, and wherein the electrical mitigation comprises replacing a wire in the communicatively coupled path.

28. The tool of claim 21, wherein the electrical characteristic comprises a resistance associated with the communicatively coupled path.

29. The tool of claim 28, wherein the deficiency comprises a resistance associated with the communicatively couple path insufficient to support communication between the processor and the process control device.

30. The tool of claim 29, wherein the electrical mitigation comprises modifying the resistance associated with the communicatively coupled path.

31. The tool of claim 30, wherein the processor renders at least one of: (i) an option to modify the resistance associated with the communicatively coupled path on the display device, (ii) providing an electrical current for an actuator device to function and communicate, and (iii) electrical current to move an actuator device.

32. The tool of claim 21, wherein the field maintenance tool is compliant with a Highway Addressable Remote Transducer protocol.

33. The tool of claim 32, further comprising detecting a lack of analog or digital communications on a communications loop, and wherein the electrical mitigation comprises polling for devices a communications loop.

34. The tool of claim 33, wherein the electrical mitigation comprises at least one of: (i) adding 167 ohms of resistance to the communicatively coupled path, (ii) adding 250 ohms of resistance to the communicatively coupled path, and (iii) adding 500 ohms of resistance to the communicatively coupled path.

35. The tool of claim 21, wherein the processor is contained within a field maintenance tool compliant with a FOUNDATION fieldbus protocol.

36. The tool of claim 35, further comprising a voltage source, wherein the voltage source provides a voltage from the field maintenance tool to the process control device.

37. The tool of claim 36, wherein the deficiency comprises a voltage above a threshold set by the electrical requirement, and wherein the process control device is compliant with a FOUNDATION Fieldbus protocol.

38. The tool of claim 37, wherein the electrical mitigation comprises disabling an attempt to provide a voltage from the field maintenance tool to the process control device.

39. The tool of claim 36, wherein the deficiency comprises a voltage of opposite polarity set by the electrical requirement.

40. The tool of claim 39, wherein the electrical mitigation comprises at least one of reversing the polarity of a voltage provided by the field maintenance tool, or the processor rendering an illustration on the display device to modify the wiring providing voltage from the field maintenance tool to the process control device.

41. A method performed by a computer processor, comprising:
detecting the presence of a communicatively coupled path between the processor and a process control device;
measuring an electrical characteristic of the communicatively coupled path;
retrieving an electrical requirement of a communication protocol of the process control device from a memory device;
calculating a deficiency in the presence of the communicatively coupled path, and between the electrical characteristic and the electrical requirement;
retrieving an electrical mitigation that reduces the deficiency from the memory device; and
rendering the electrical mitigation on a display device;
wherein the electrical mitigation further comprises modifying a wiring configuration in the communicatively coupled path, and wherein the processor renders wiring instructions on the display device, and
wherein the wiring instructions comprise an illustration of proper wiring connections on a process control device.

42. The method of claim 41, further comprising polling for Highway Addressable Remote Transducer devices, and
wherein the electrical characteristic and electrical requirement comprises at least one of:
(i) a presence of a voltage and the presence of Highway Addressable Remote Transducer communications on the communicatively coupled path,
(ii) a presence of a voltage and no communications on the communicatively coupled path, and
(iii) no voltage and no communications on the communicatively coupled path.

43. The method of claim 41, further comprising starting FOUNDATION Fieldbus communications, and
wherein the electrical characteristic and electrical requirement comprises a voltage and the presence of FOUNDATION Fieldbus communications on the communicatively coupled path.

44. The method of claim 41, further comprising detecting the severing of a communicatively coupled path between the processor and a process control device.

45. The method of claim 41, wherein the electrical characteristic and electrical requirement comprises communication and a voltage on the communicatively coupled path,
wherein the electrical mitigation comprises modifying a current on the communicatively coupled path, and
wherein the electrical mitigation comprises supplying a voltage to the process control device.

46. The method of claim 41, wherein the electrical requirement comprises a requirement of FOUNDATION Fieldbus communications, and wherein the electrical characteristic comprises Highway Addressable Remote Transducer communications.

47. The method of claim 41, wherein the electrical requirement comprises a requirement of Highway Addressable Remote Transducer communications, and wherein the electrical characteristic comprises FOUNDATION Fieldbus communications.

48. The method of claim 41, wherein the electrical mitigation comprises sourcing current to the process control device, and wherein the process control device is a positioner.

49. The method of claim 41, wherein the electrical mitigation comprises sourcing a higher current to the process control device during diagnostics or software updates.

50. The method of claim 41, wherein the process control device comprises a transmitter, and wherein electrical requirement comprises a positioner control signal.

51. The method of claim 41, wherein the process control device comprises a positioner, and wherein the electrical requirement comprises a transmitter control signal.

52. The method of claim 41, comprising receiving an indication at the processor to cancel the electrical mitigation.

53. The method of claim 41, comprising dynamically updating the rendering of the electrical mitigation on the display device as the electrical characteristic changes.

54. The method of claim 41, comprising attempting communication on the communicatively coupled path in response to a change in the electrical characteristic.

55. The method of claim 41, comprising undoing the electrical mitigation in response to an undo indication from a human-machine interface.

56. The method of claim 41, comprising repeating the electrical mitigation without an indication from a human-machine interface.

57. The method of claim 41, wherein the electrical mitigation comprises preventing an electrical modification to the communicatively coupled path.

\* \* \* \* \*